United States Patent
Sugio et al.

(10) Patent No.: US 12,294,717 B2
(45) Date of Patent: *May 6, 2025

(54) MOVING PICTURE CODING METHOD, MOVING PICTURE CODING APPARATUS, MOVING PICTURE DECODING METHOD, MOVING PICTURE DECODING APPARATUS, AND MOVING PICTURE CODING AND DECODING APPARATUS

(71) Applicant: Sun Patent Trust, New York, NY (US)

(72) Inventors: Toshiyasu Sugio, Osaka (JP); Takahiro Nishi, Nara (JP); Youji Shibahara, Osaka (JP); Kyoko Tanikawa, Osaka (JP); Hisao Sasai, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/659,460

(22) Filed: May 9, 2024

(65) Prior Publication Data

US 2024/0292000 A1 Aug. 29, 2024

Related U.S. Application Data

(60) Continuation of application No. 18/203,709, filed on May 31, 2023, now Pat. No. 12,015,782, which is a
(Continued)

(51) Int. Cl.
*H04N 19/00* (2014.01)
*H04N 7/00* (2011.01)
(Continued)

(52) U.S. Cl.
CPC ............. *H04N 19/139* (2014.11); *H04N 7/00* (2013.01); *H04N 19/105* (2014.11);
(Continued)

(58) Field of Classification Search
CPC ........... H04N 19/00; H04N 13/00; H04N 7/00
See application file for complete search history.

(56) References Cited

U.S. PATENT DOCUMENTS

| | | |
|---|---|---|
| 6,539,059 B1 | 3/2003 | Sriram et al. |
| 7,630,438 B2 | 12/2009 | Mukerjee et al. |

(Continued)

FOREIGN PATENT DOCUMENTS

| | | |
|---|---|---|
| EP | 2 346 257 | 7/2011 |
| WO | 2010/052838 | 5/2010 |

OTHER PUBLICATIONS

"Advanced video coding for generic audiovisual services", ITU-T Recommendation H.264, Mar. 2010.
(Continued)

*Primary Examiner* — Maryam A Nasri
(74) *Attorney, Agent, or Firm* — Wenderoth, Lind & Ponack, L.L.P.

(57) ABSTRACT

A moving picture coding apparatus includes an intra-inter prediction unit which calculates a second motion vector by performing a scaling process on a first motion vector of a temporally neighboring corresponding block, when selectively adding, to a list, a motion vector of each of one or more corresponding blocks each of which is either a block included in a current picture to be coded and spatially neighboring a current block to be coded or a block included in a picture other than the current picture and temporally neighboring the current block, determines whether the second motion vector has a magnitude that is within a predetermined magnitude or not within the predetermined mag-
(Continued)

nitude, and adds the second motion vector to the list when the intra-inter prediction unit determines that the second motion vector has a magnitude that is within the predetermined magnitude range.

2 Claims, 39 Drawing Sheets

Related U.S. Application Data continuation of application No. 17/833,649, filed on Jun. 6, 2022, now Pat. No. 11,711,521, which is a continuation of application No. 17/000,920, filed on Aug. 24, 2020, now Pat. No. 11,356,669, which is a continuation of application No. 16/392,565, filed on Apr. 23, 2019, now Pat. No. 10,757,418, which is a continuation of application No. 15/345,920, filed on Nov. 8, 2016, now Pat. No. 10,321,133, which is a continuation of application No. 14/729,321, filed on Jun. 3, 2015, now abandoned, which is a continuation of application No. 14/490,910, filed on Sep. 19, 2014, now Pat. No. 9,094,682, which is a continuation of application No. 14/058,636, filed on Oct. 21, 2013, now Pat. No. 8,885,722, which is a division of application No. 13/712,041, filed on Dec. 12, 2012, now Pat. No. 8,867,620.

(60) Provisional application No. 61/576,501, filed on Dec. 16, 2011.

(51) Int. Cl.

| | | |
|---|---|---|
| *H04N 19/105* | (2014.01) | |
| *H04N 19/124* | (2014.01) | |
| *H04N 19/13* | (2014.01) | |
| *H04N 19/137* | (2014.01) | |
| *H04N 19/139* | (2014.01) | |
| *H04N 19/15* | (2014.01) | |
| *H04N 19/159* | (2014.01) | |
| *H04N 19/176* | (2014.01) | |
| *H04N 19/44* | (2014.01) | |
| *H04N 19/503* | (2014.01) | |
| *H04N 19/51* | (2014.01) | |
| *H04N 19/513* | (2014.01) | |
| *H04N 19/52* | (2014.01) | |
| *H04N 19/56* | (2014.01) | |
| *H04N 19/567* | (2014.01) | |
| *H04N 19/593* | (2014.01) | |
| *H04N 19/61* | (2014.01) | |
| *H04N 19/172* | (2014.01) | |

(52) U.S. Cl.
CPC ........... *H04N 19/124* (2014.11); *H04N 19/13* (2014.11); *H04N 19/137* (2014.11); *H04N 19/15* (2014.11); *H04N 19/159* (2014.11); *H04N 19/176* (2014.11); *H04N 19/44* (2014.11); *H04N 19/503* (2014.11); *H04N 19/51* (2014.11); *H04N 19/513* (2014.11); *H04N 19/52* (2014.11); *H04N 19/56* (2014.11); *H04N 19/567* (2014.11); *H04N 19/593* (2014.11); *H04N 19/61* (2014.11); *H04N 19/172* (2014.11)

(56) References Cited

U.S. PATENT DOCUMENTS

| | | | | |
|---|---|---|---|---|
| 2003/0086496 | A1* | 5/2003 | Zhang | G06V 20/40 |
| | | | | 348/172 |
| 2004/0057523 | A1* | 3/2004 | Koto | H04N 19/142 |
| | | | | 375/E7.257 |
| 2007/0183505 | A1* | 8/2007 | Shimizu | H04N 19/537 |
| | | | | 375/E7.125 |
| 2008/0031342 | A1 | 2/2008 | Jeon | |
| 2009/0161697 | A1 | 6/2009 | Wang et al. | |
| 2011/0085600 | A1 | 4/2011 | Clancy | |
| 2012/0134416 | A1 | 5/2012 | Lin et al. | |
| 2012/0269270 | A1 | 10/2012 | Chen et al. | |
| 2013/0163668 | A1* | 6/2013 | Chen | H04N 19/463 |
| | | | | 375/240.14 |

OTHER PUBLICATIONS

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d2, 6th Meeting: Torino, IT, Jul. 14-22, 2011.
Office Action issued Apr. 22, 2014 in U.S. Appl. No. 14/058,636.
International Search Report issued Mar. 19, 2013 in corresponding International Application No. PCT/JP2012/007895.
Recommendation ITU-T H.264, Mar. 2009, Advanced video coding for generic audiovisual services, 8.4.1.2.3, A.3.1, Table A-1.
Il-Koo Kim et al., "Restriction on motion vector scaling for Merge and AMVP", Joint Collaborative Team on Video Coding (JCT-VC) of ITU-T SG16 WP3 and ISO/IEC JTC1/SC29/WG11, 7th Meeting: Geneva, CH, Nov. 21-30, 2011, [JCTVC-G551].
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d6, Ver. 7, 6th Meeting: Torino, IT, Jul. 14-22, 2011.
Office Action issued Jan. 17, 2014 in U.S. Appl. No. 13/712,041.
Notice of Allowance mailed Oct. 2, 2014 in U.S. Appl. No. 14/446,420.
Extended European Search Report issued Jun. 1, 2015 in corresponding European Patent Application No. 12857032.2.
Michael Horowitz, "WD4: Working Draft 4 of High-Efficiency Video Coding interim version," Joint Collaborative Team on Video Coding (JCT-VC) of ITU-T SG16 WP3 and ISO/IEC JTC1/SC29/WG11, JCTVC-G1004, 7th Meeting: Geneva, CH, Nov. 21-30, 2011, XP030110988.
Sung-Chang Lim et al., "Dynamic range restriction of temporal motion vector," Joint Collaborative Team on Video Coding (JCT-VC) of ITU-T SG16 WP3 and ISO/IEC JTC1/SC29/WG11, JCTVC-E142, 5th Meeting: Geneva, CH, Mar. 16-23, 2011, XP030008648.
Muhammed Coban et al., "Motion Vector Predictor Candidate Clipping Removal," Joint Collaborative Team on Video Coding (JCT-VC) of ITU-T SG16 WP3 and ISO/IEC JTC1/SC29/WG11, JCTVC-G134, 7th Meeting: Geneva, CH, Nov. 21-30, 2011, XP030110118.
Toshiyasu Sugio et al., "Non-CE9: Modification of derivation process for MVP candidate in AMVP/Merge," Joint Collaborative Team on Video Coding (JCT-VC) of ITU-T SG16 WP3 and ISO/IEC JTC1/SC29/WG11, JCTVC-H0216, WG11 No. m23091, 8th Meeting: San José, CA, USA, Feb. 1-10, 2012, XP030111243.
Office Action with Search Report issued Aug. 2, 2016 in Taiwanese Patent Application No. 101146859, with English translation of Search Report.
Xiangyang Ji et al., "Enhanced Direct Mode Coding for Bi-Predictive Pictures", Proceedings of the 2004 International Symposium on Circuits and Systems, vol. 3, pp. III-785-III788, 2004.
ITU-T Recommendation H.263, "Video Coding for Low Bit Rate Communication", Mar. 6, 2007.
Decision of Grant issued Sep. 8, 2016 in Russian Patent Application No. 2013158874, with English translation.
Michael Horowitz, "Proposed text for some features not yet integrated into JCTVC-F803", Joint Collaborative Team on Video

(56) References Cited

OTHER PUBLICATIONS

Coding (JCT-VC) of ITU-T SG16 WP3 and ISO/IEC JTC1/SG29/WG11, 7th Meeting Geneva, CH, Nov. 21-30, 2011, JCTVC-G1004r3.

Chuang, Tzu-Der, et al., "Non-CE9: Division-Free MV Scaling", Joint Collaborative Team on Video Coding (JCT-VC) of ITU-T SC16 WP3 and ISO/IEC JTC1/SC29/WG11, 7th Meeting: Geneva, CH, Nov. 21-30, 2011, 6 pages.

\* cited by examiner

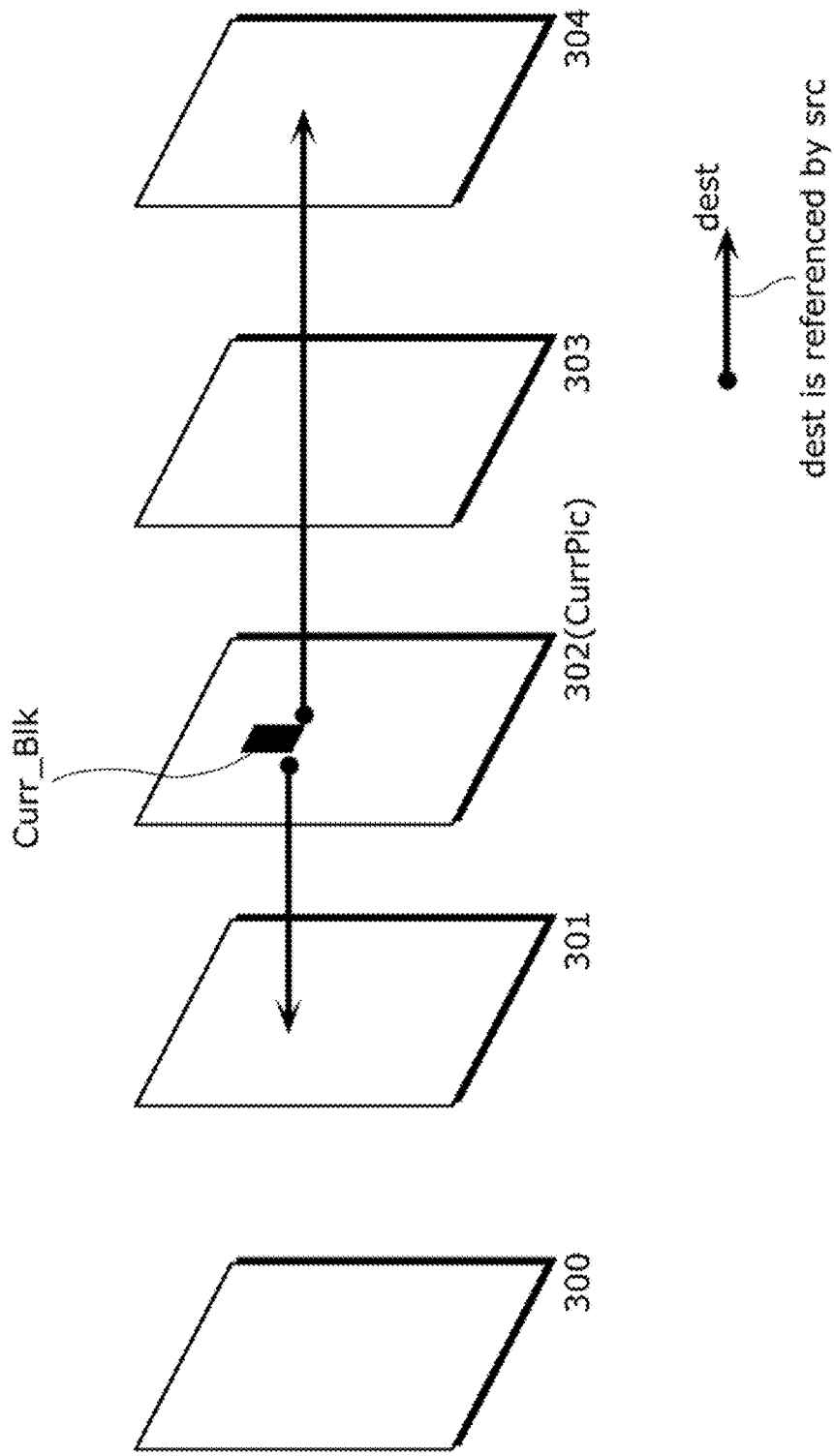

FIG. 2A

RefPicList0 (Reference picture list L0)

| refIdxL0 value | RefPicList0[refIdxL0] value = picNum |
|---|---|
| 0 | RefPicList0 [0] = 301 |
| 1 | RefPicList0 [1] = 300 |
| ... | ... |
| 11 | RefPicList0 [11] = 303 |
| 12 | RefPicList0 [12] = 304 |

Descending order ↓

Ascending order ↓

FIG. 2B

RefPicList1 (Reference picture list L1)

| refIdxL1 value | RefPicList1 [refIdxL1] value = picNum |
|---|---|
| 0 | RefPicList1 [0] = 303 |
| 1 | RefPicList1 [1] = 304 |
| ... | ... |
| 13 | RefPicList1 [11] = 301 |
| 14 | RefPicList1 [12] = 300 |

Ascending order ↓

Descending order ↓

FIG. 6

Otherwise, the motion vectors mvL0, mvL1 are derived as scaled versions of the motion vector mvCol of the co-located sub-macroblock partition as specified below (see Figure 8-2).

$tx = (16384 + Abs(td/2))/td$     (8-199)

$DistScaleFactor = Clip3(-1024, 1023, (tb*tx+32)>>6)$     (8-200)

$mvL0 = (DistScaleFactor * mvCol + 128) >> 8$     (8-201)

$mvL1 = mvL0 - mvCol$     (8-202)

where tb and td are derived as:

$tb = Clip3(-128, 127, DiffPicOrderCnt(currPicOrField, pic0))$     (8-203)

$td = Clip3(-128, 127, DiffPicOrderCnt(pic1, pic0))$     (8-204)

(STEP1) derivation of DistScaleFactor (STEP2) mvL0 multiplying mvCol by a (Dist)Scalefactor

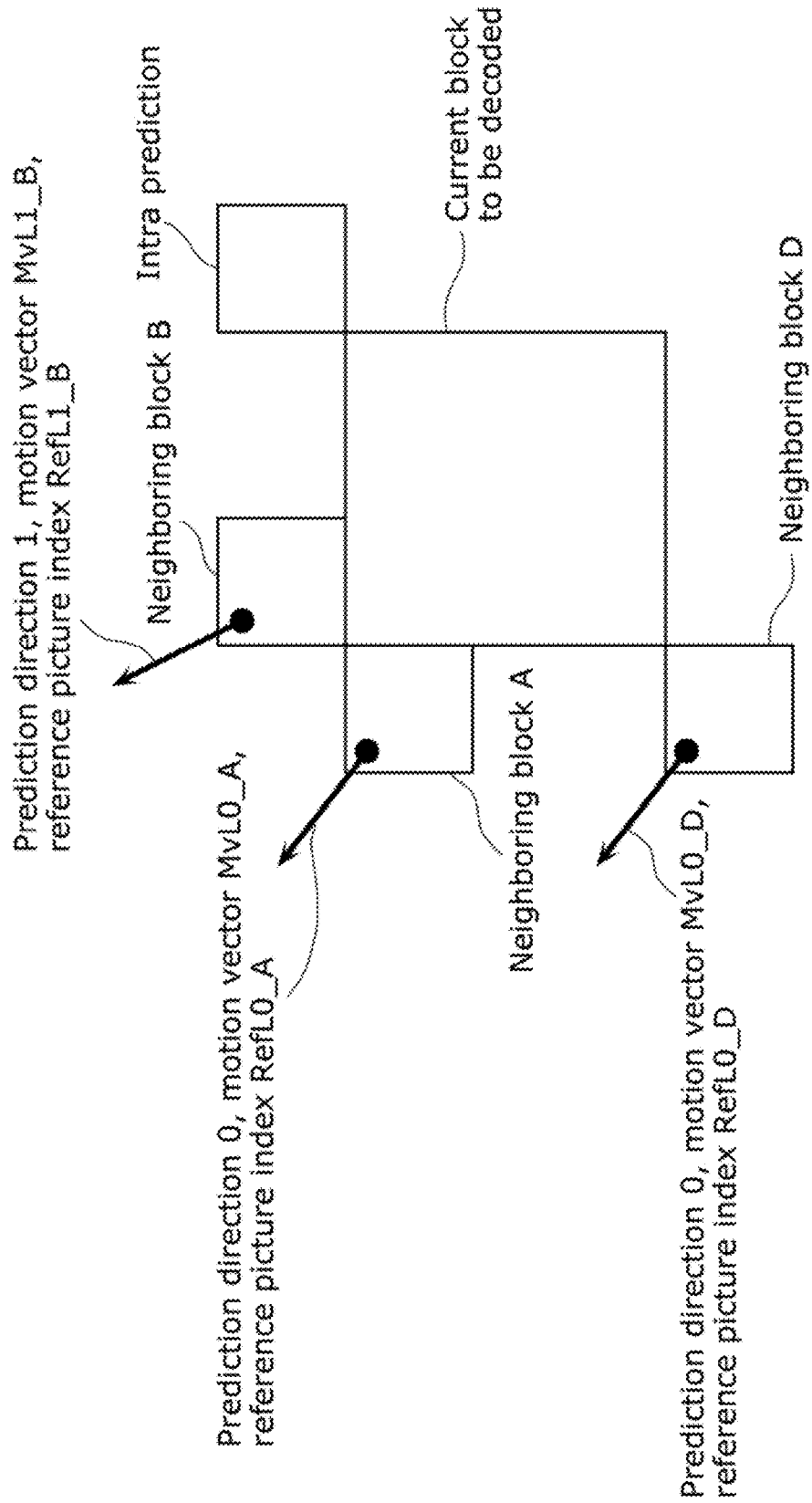

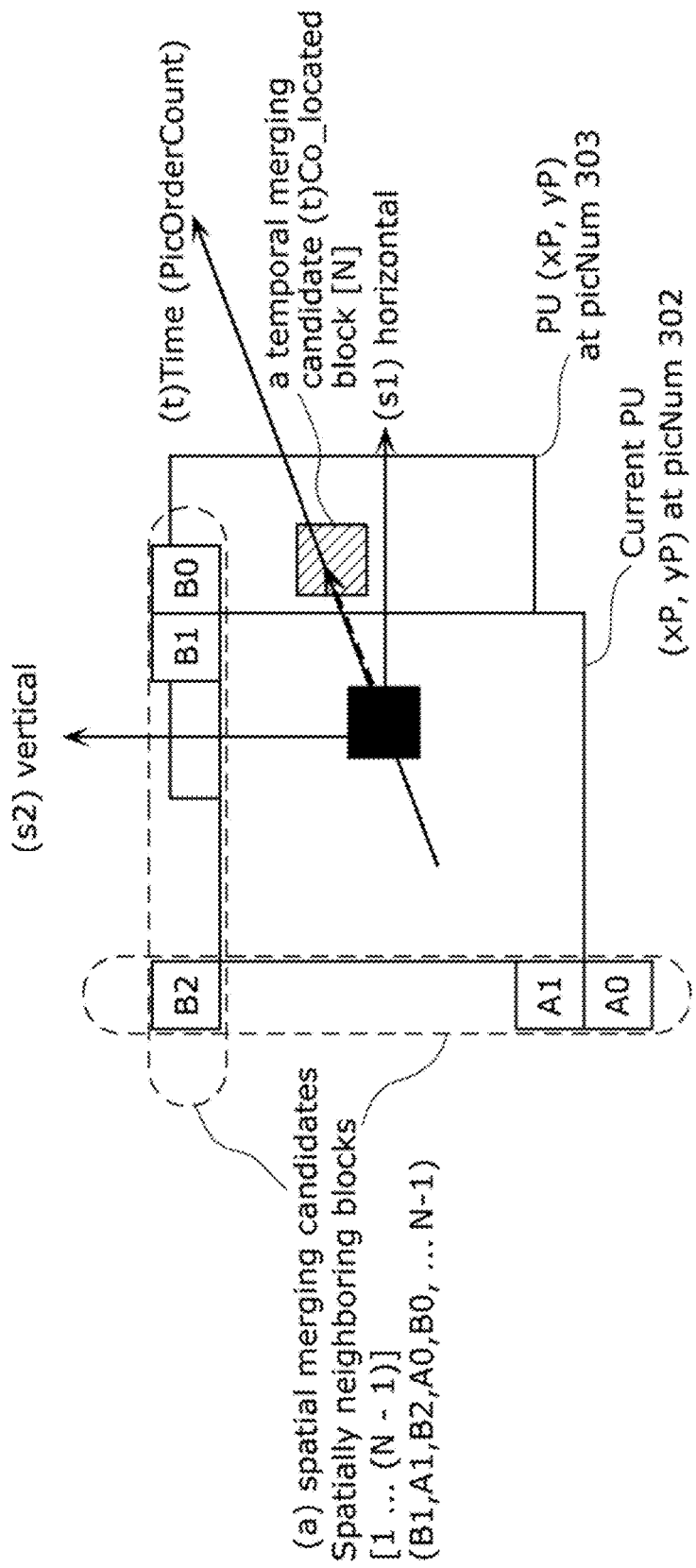

FIG. 11 mergeCandList

| | Motion data for both of L0 and L1 | merge_idx |
|---|---|---|
| i = 1 | A1: L0(mvL0, refIdxL0), L1(mvL1, refIdxL1) | 0 |
| 2 | B1: L0(mvL0, refIdxL0), L1(mvL1, refIdxL1) | 1 |
| 3 | B0: L0(mvL0, refIdxL0), L1(mvL1, refIdxL1) | duplicate motion vectors |
| 4 | A2: L0(mvL0, refIdxL0), L1(mvL1, refIdxL1) | Not Available (availableFlagA2 false) |
| 5 | B2: L0(mvL0, refIdxL0), L1(mvL1, refIdxL1) | duplicate motion vectors |
| 6 | temporal motion vectors derived from Colocated Block | 2 |

(s) Spatially neighboring blocks [1 ... (N − 1)]
spatial merging candidates
(1 ... (N−1)) = (A1, B1, B0, A0, ... B2)

(t) Co-located block [N] N = Col,
a temporal merging candidate

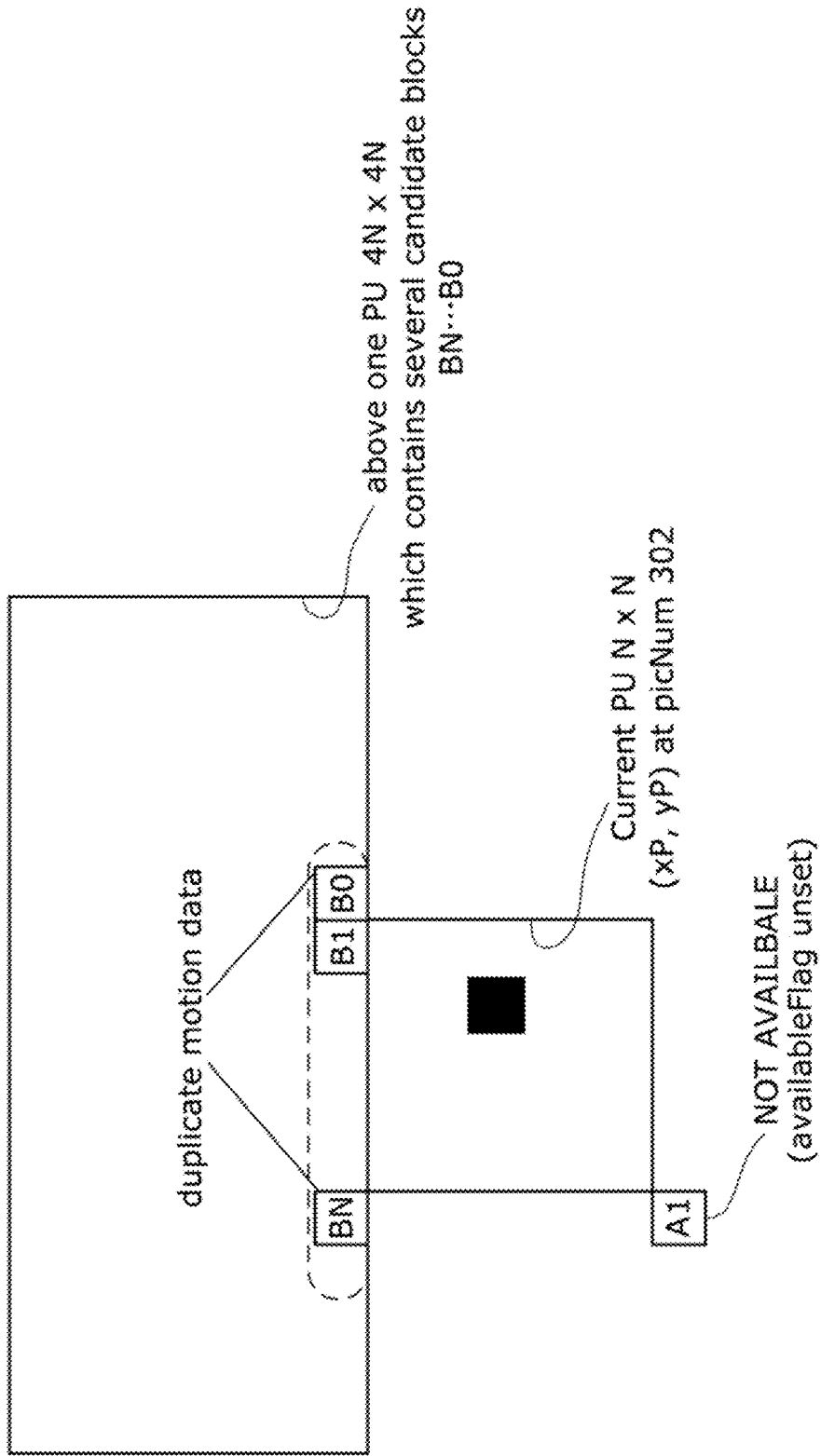

FIG. 18

(a) Generated initial mergeCandList
(Original Merge candidate list)

| Merge_idx | L0 | L1 |
|---|---|---|
| 0 | mvL0_A, ref0 | — |
| 1 | — | mvL1_B, ref0 |
| 2 | | |
| 3 | | |
| 4 | | |

(b) Updated mergeCandList
(Merge candidate list after adding combined candidates)

| Merge_idx | L0 | L1 |
|---|---|---|
| 0 | mvL0_A, ref0 | combine |
| 1 | — | mvL1_B, ref0 |
| 2 | mvL0_A, ref0 | mvL1_B, ref0 |
| 3 | | |
| 4 | | | new entry merge_Idx = 2;

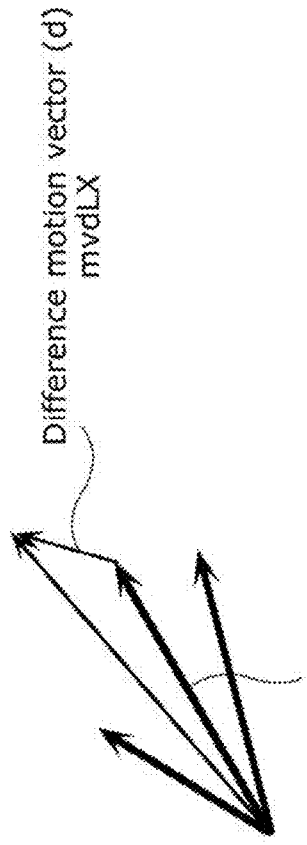

FIG. 19A

Motion vector (v) (resulting from motion estimation) mvLX

Difference motion vector (d) mvdLX mvpLX (one chosen from 1 or more candidate(s))

FIG. 19B

List of mvpLX motion vector predictor candidates mvpListLX (X being 0 or 1)
(List of motion vector predictor candidates)

| Value of mvp_idx_lX | Value of mvp_idx_lX[mvp_idx_lX] | N |
|---|---|---|
| 0 | mvLXA, if availableFlagLXA is equal to 1 | A |
| mvp_idx_lX += (1 * available) | mvLXB, if availableFlagLXB is equal to 1 | B |
| mvp_idx_lX += (1 * available) | mvLXCol, if availableFlagLXCol is equal to 1 | Col |

(s) spatial block spatial candidates
(t) temporal block a temporal candidate

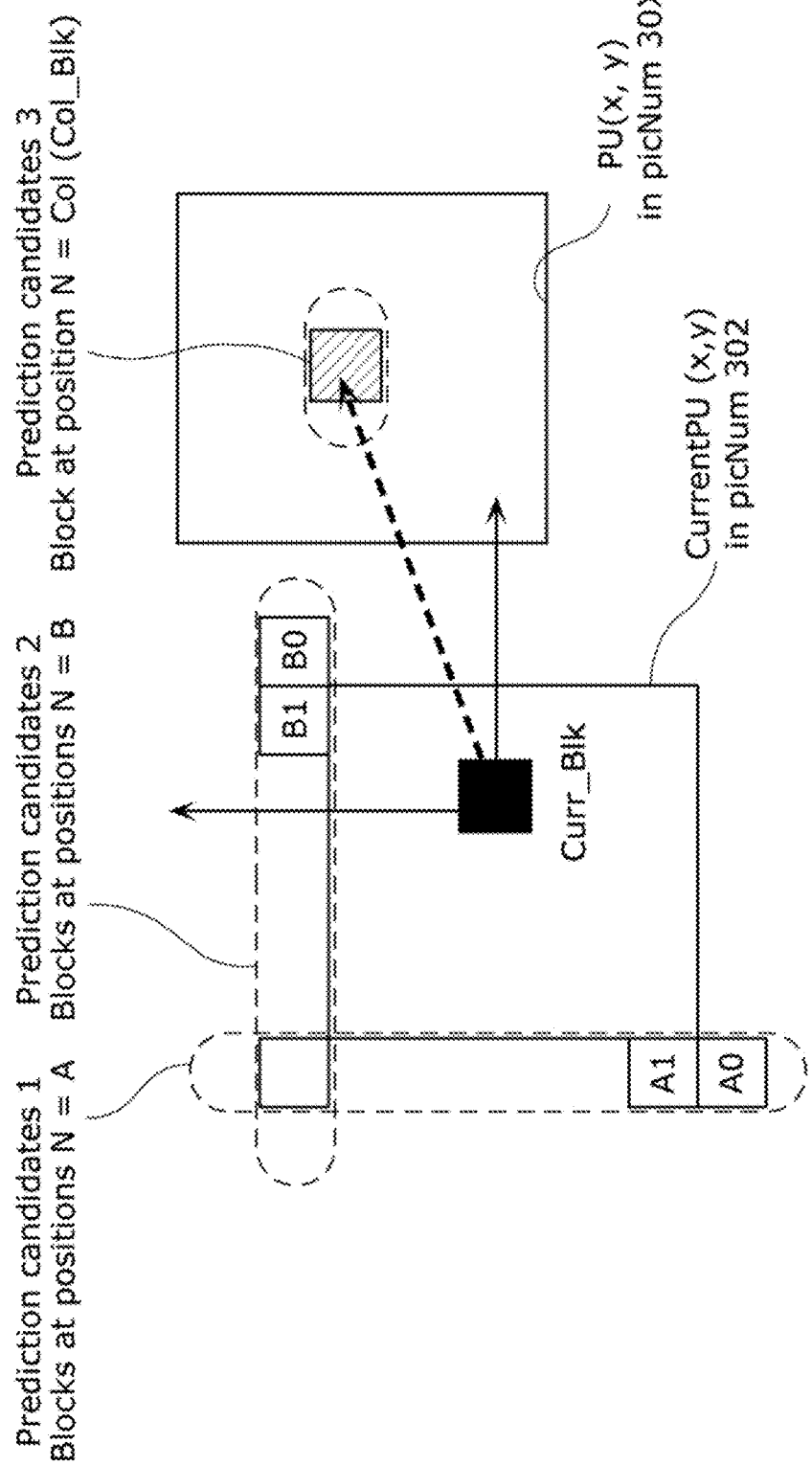

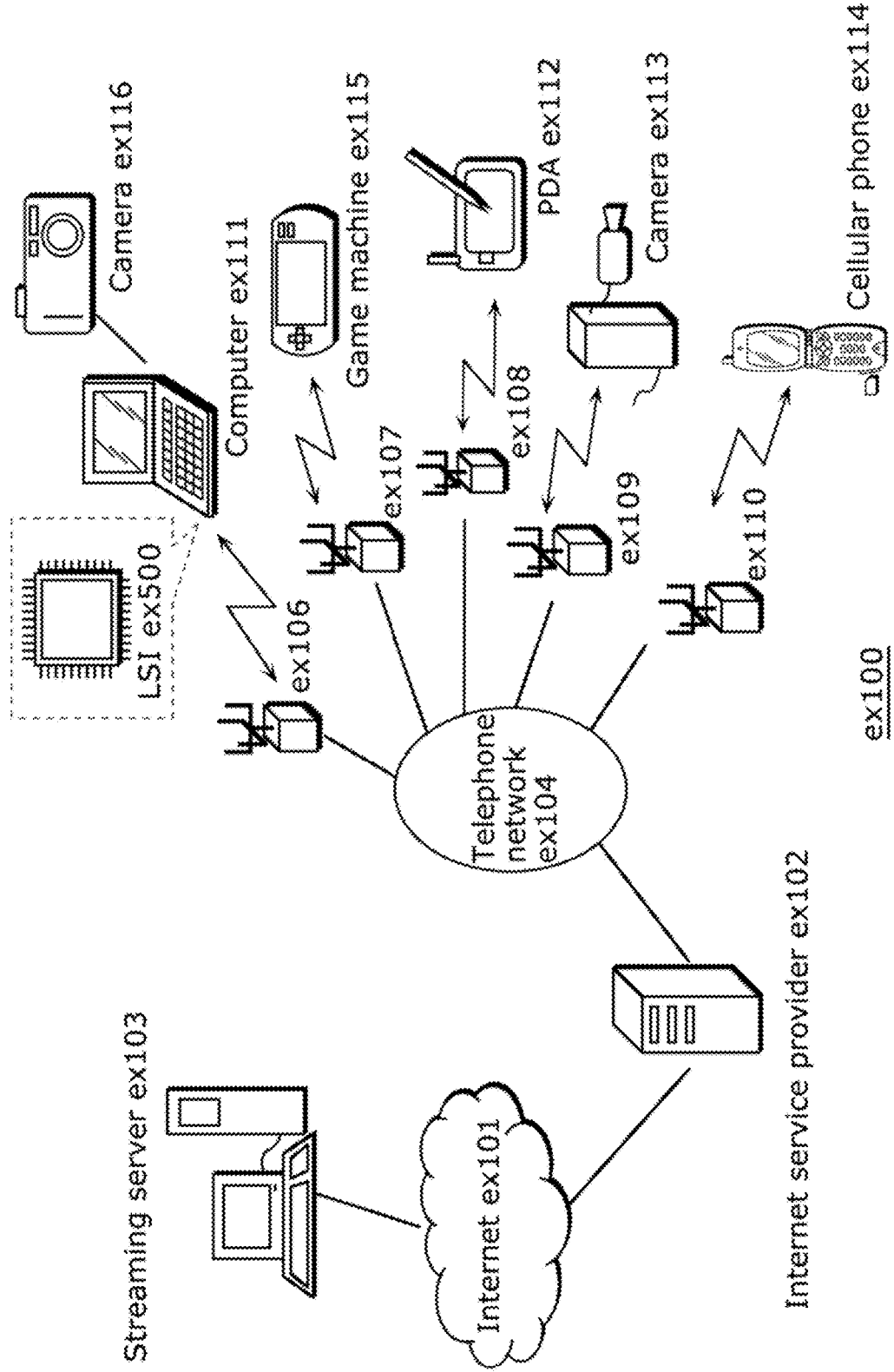

FIG. 27

| |
|---|
| Video stream (PID=0x1011 Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00 Secondary video) |
| Video stream (PID=0x1B01 Secondary video) |

FIG. 30
Stream of TS packets
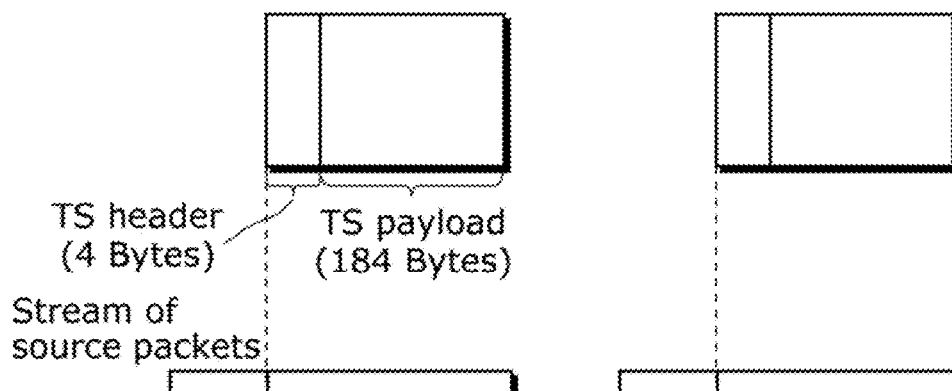
Multiplexed data
SPN 0 1 2 3 4 5 6 7 ...
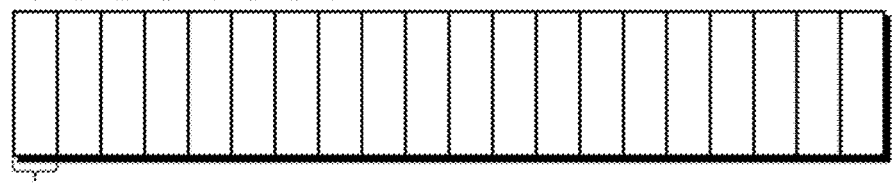
Source packet

FIG. 38

| Corresponding standard | Driving frequency |
|---|---|
| MPEG-4 AVC | 500 MHz |
| MPEG-2 | 350 MHz |
| ⋮ | ⋮ |

MOVING PICTURE CODING METHOD, MOVING PICTURE CODING APPARATUS, MOVING PICTURE DECODING METHOD, MOVING PICTURE DECODING APPARATUS, AND MOVING PICTURE CODING AND DECODING APPARATUS

CROSS REFERENCE TO RELATED APPLICATIONS

The present application is a continuation of U.S. application Ser. No. 18/203,709, filed May 31, 2023, which is a continuation of Ser. No. 17/833,649, filed Jun. 6, 2022, now U.S. Pat. No. 11,711,521, which is a continuation of U.S. application Ser. No. 17/000,920, filed Aug. 24, 2020, now U.S. Pat. No. 11,356,669, which is a continuation of U.S. application Ser. No. 16/392,565, filed Apr. 23, 2019, now U.S. Pat. No. 10,757,418, which is a continuation of U.S. application Ser. No. 15/345,920, filed Nov. 8, 2016, now U.S. Pat. No. 10,321,133, which is a continuation of U.S. application Ser. No. 14/729,321, filed Jun. 3, 2015, now abandoned, which is a continuation of U.S. application Ser. No. 14/490,910, filed Sep. 19, 2014, now U.S. Pat. No. 9,094,682, which is a continuation of U.S. application Ser. No. 14/058,636, filed Oct. 21, 2013, now U.S. Pat. No. 8,885,722, which is a divisional of U.S. application Ser. No. 13/712,041, filed Dec. 12, 2012, now U.S. Pat. No. 8,867,620, which claims the benefit of U.S. Provisional Patent Application No. 61/576,501 filed Dec. 16, 2011. The entire disclosures of the above-identified applications, including the specification, drawings and claims are incorporated herein by reference in their entirety.

FIELD

The present disclosure relates to a moving picture coding method for coding pictures on a block-by-block basis, and a moving picture decoding method for decoding pictures on a block-by-block basis.

BACKGROUND

In inter prediction decoding in H.264, picture data of a current block is decoded by predicting a bi-predictive reference block included in a B slice using, as references, two items of picture data which is data of pictures different from the picture including the current block.

For the H.264 standard, there are motion vector derivation modes available for picture prediction. The modes are referred to as direct modes (see 8.4.1.2.1, 3.45, etc. of NPL 1).

The following two modes of (S) and (T) are available as the direct modes in H.264.

(T): Temporal direct mode (temporal mode). A current block is predicted using a motion vector mvCol of a co-located block (Col_Blk), which is spatially identical to the current block (but temporally different), is scaled by a certain percentage.

(S): Spatial direct mode. A current block is predicted using data on a motion vector (motion data) of a block which is spatially different (but is to be displayed at the same time as a current block).

CITATION LIST

Non Patent Literature

[NPL 1] ITU-T H.264 03/2010

[NPL 2] WD4: Working Draft 4 of High-Efficiency Video Coding Joint Collaborative Team on Video Coding (JCT-VC) of ITU-T SG16 WP3 and ISO/IEC JTC1/SC29/WG11 6th Meeting: Torino, IT, 14-22 Jul. 2011, Document: JCTVC-F803_d2

SUMMARY

Technical Problem

However, prediction in the temporal direct mode involves multiplication for scaling. Such multiplication may cause increase in load in coding or decoding because motion vectors used in coding or decoding may need to be handled at a higher bit precision.

In view of this, one non-limiting and exemplary embodiment provides a moving picture coding method and a moving picture decoding method each of which may cause reduced load and be performed with the same coding efficiency.

Solution to Problem

A moving picture coding method according to an aspect of the present disclosure is a moving picture coding method for coding pictures on a block-by-block basis, and includes: selectively adding, to a list, a motion vector of each of one or more corresponding blocks each of which is (i) a block included in a current picture to be coded and spatially neighboring a current block to be coded or (ii) a block included in a picture other than the current picture and temporally neighboring the current block; selecting a motion vector from among the motion vectors in the list, the selected motion vector being to be used for coding the current block; and coding the current block using the motion vector selected in the selecting, wherein in the adding, a scaling process is performed on a first motion vector of the temporally neighboring corresponding block to calculate a second motion vector, whether the calculated second motion vector has a magnitude that is within a predetermined magnitude range or a magnitude that is not within the predetermined magnitude is determined, and the second motion vector is added to the list as the motion vector of the corresponding block when it is determined that the second motion vector has a magnitude that is within the predetermined magnitude range.

Furthermore, a moving picture decoding method according to an aspect of the present disclosure is a moving picture decoding method for decoding pictures on a block-by-block basis, and includes: selectively adding, to a list, a motion vector of each of one or more corresponding blocks each of which is (i) a block included in a current picture to be decoded and spatially neighboring a current block to be decoded or (ii) a block included in a picture other than the current picture and temporally neighboring the current block; selecting a motion vector from among the motion vectors in the list, the selected motion vector being to be used for decoding the current block; and decoding the current block using the motion vector selected in the selecting, wherein in the adding, a scaling process is performed on a first motion vector of the temporally neighboring corresponding block to calculate a second motion vector, whether the calculated second motion vector has a magnitude that is within a predetermined magnitude range or a magnitude that is not within the predetermined magnitude is determined, and the second motion vector is added to the list as the motion vector of the corresponding block when it is determined that the second motion vector has a magnitude that is within the predetermined magnitude range.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The moving picture coding methods and the moving picture decoding methods disclosed herein each enables coding or decoding of moving pictures with reduced processing load while causing no reduction in coding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 illustrates two pictures referenced for decoding of a current block (Curr_Blk).

FIG. 2A illustrates a reference picture list (RefPicList0).

FIG. 2B illustrates a reference picture list (RefPicList1).

FIG. 6 illustrates a relationship between STEPs 1 to 3 and equations for deriving motion vectors described in NPL 1.

FIG. 7 illustrates a (S) spatial direct mode.

FIG. 10 illustrates merging candidate blocks [1 . . . 6] set by an intra-inter prediction unit.

FIG. 11 illustrates concept of the merging candidate list (mergeCandList).

FIG. 12 illustrates an example case where the inter-intra prediction unit determines that motion data is a duplicate.

FIG. 18 illustrates update of a merging candidate list (mergeCandList) using (a) a generated initial merging candidate list (mergeCandList) and (b) a merging candidate list after being updated.

FIG. 19A illustrates a motion vector predictor mvpLX in HEVC.

FIG. 19B illustrates a candidate list mvpListLX (mvpListL0 and mvpListL1) for the motion vector predictor mvpLX.

FIG. 20 illustrates predictor candidate blocks or a predictor candidate block.

FIG. 21 shows an overall configuration of a content providing system for implementing content distribution services.

FIG. 27 illustrates a structure of multiplexed data.

FIG. 30 shows a structure of TS packets and source packets in the multiplexed data.

FIG. 38 shows an example of a look-up table in which video data standards are associated with driving frequencies.

Figure 3:
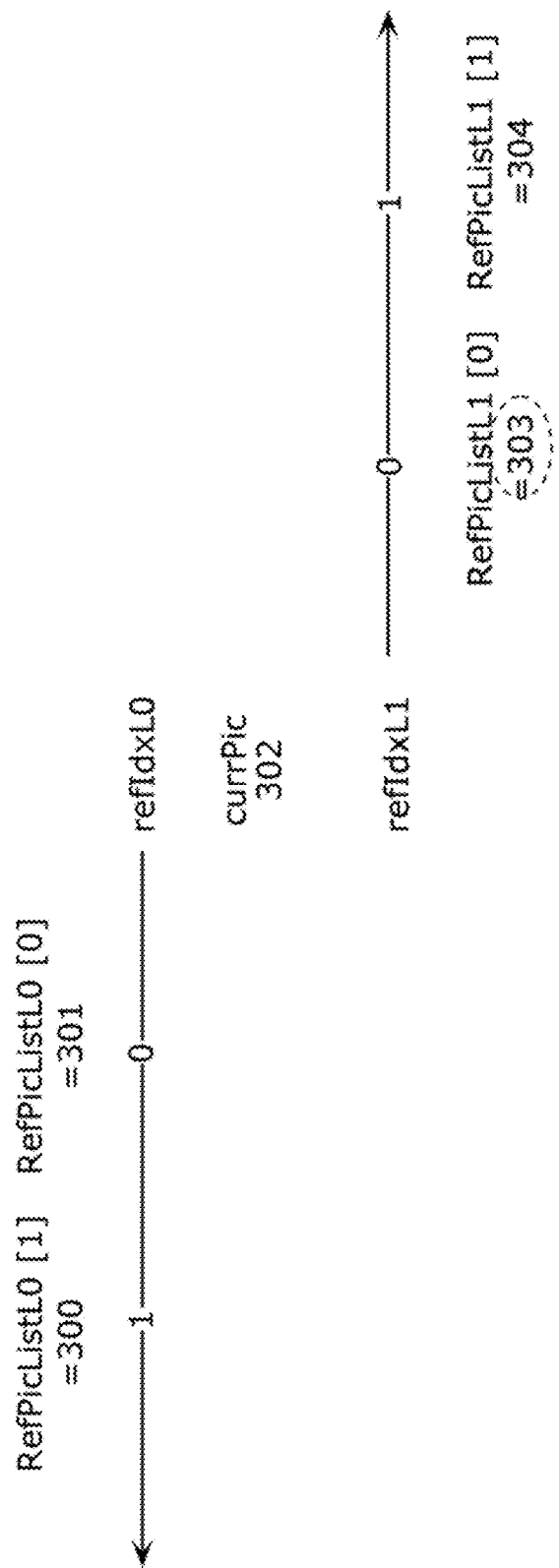
FIG. 3 illustrates picNum in the reference picture lists RefPicList0 and RefPicList1 of the CurrBlk included.

DESCRIPTION OF EMBODIMENTS (Underlying Knowledge Forming Basis of the Present Disclosure)

FIG. 1 illustrates a configuration of a picture coding apparatus in accordance with the standard of HEVC.

(Underlying Knowledge Forming Basis of the Present Disclosure)

FIG. 1 illustrates two pictures referenced for decoding of a current block (Curr_Blk). In FIG. 1, the numbers "300" to "304" are picture numbers (PicNum), and the pictures are arranged in ascending order of values of display order (PicOrderCnt). The current block to be decoded is included in a picture numbered 302 (CurrPic). In this example, the current block to be decoded references a picture having a PicNum of 301 and a picture having a PicNum of 304. The picture having a PicNum of 301 precedes the picture including the current block in the display order, and the picture having a PicNum of 304 follows the picture including the current block in the display order. In the following Drawings, the starting point of an arrow indicates a referencing picture (a picture to be decoded) and the head of an arrow indicates a picture to be used for decoding (a picture to be referenced) as described in the legend to FIG. 1.

Current blocks to be decoded are indicated by a solid black block in the following Drawings, and simply referred to as Curr_Blk in the Drawing and following description. Again, the starting point of an arrow indicates a referencing picture (a picture to be decoded) and the head of an arrow indicates a picture to be used for decoding (a picture to be referenced) as described in the legend to FIG. 1. The picture having a picNum of 302 is a picture including a current block to be decoded (a current picture to be decoded).

FIG. 2A and FIG. 2B illustrate two reference picture lists, RefPicList0 and RefPicList1, respectively.

FIG. 2A illustrates a reference picture list 0 (RefPicList0) which is a list for identifying one of two reference pictures. FIG. 2B shows a reference picture list 1 (RefPicList1) which is a list for identifying the other of the two reference pictures. By using the reference picture lists, it is possible to specify a reference picture referenced by a current picture to be decoded, using an index having a small value such as "0" or "1" (refIdxL0 and refIdxL1) instead of the picNum having a large value such as "302". Pictures referenced by current blocks to be decoded (Curr_Blk), which are blocks in a slice, are indicated using the values in these lists.

These lists are initialized (generated) when a B slice including a current block is decoded.

Entries in the reference picture lists RefPicList0 and RefPicList1 are reordered so that indices having less values in the reference picture list RefPicList0 and the reference picture list RefPicList1 indicate pictures having different picture numbers picNum. Each of the reference picture lists are divided into the first half including pictures preceding the picNum302 and the second half including pictures following the picNum302. In the first half of the reference picture list 0, the picture indices are assigned picture numbers in descending order (301, 300 . . . ). In the first half of the reference picture list 1, the picture indices are assigned picture numbers in ascending order (303, 304 . . . ).

For example, when a code sequence has an index having a minimum value "0" for each of the reference picture list 0 and the reference picture list 1, the following two reference pictures are determined for the picture 302.

One of the reference pictures is a picture indicated by RefPicList0[0], which is a picture 301 immediately before the picture 302. The other of the reference pictures is a picture indicated by RefPicList1[0], which is a picture 303 immediately after the picture 302.

In the example illustrated in FIG. 1, one index refIdxL0 is 0, and therefore the current picture 302 references the picture 301. The other index refIdxL1 is 1, and therefore the current picture 302 references the picture 304.

FIG. 3 illustrates picNum in the case where the values of refIdxL0 and refIdxL1 in each of the reference picture lists RefPicList0 and RefPicList1 of the CurrBlk included in the picture 302 increase from "0". Greater values in the list (the value of refIdxL0 and the value of refIdxL1) indicate pictures more distant from the current picture to be decoded (picNum302).

Particularly, RefPicList1, which indicates the other reference, holds indices under a rule that indices having less values in the list are assigned pictures following the CurrPic picture 302 (that is, pictures greater than PicOrderCnt (CurrPic) and already decoded and stored in the memory) in descending order (the rule is referred to as Rule 1). Under the Rule 1, the picture indicated by RefPicList1[0] is a picture picNum 303 indicated by a dashed circle in FIG. 3.

As seen above, the one reference picture list is simply referred to as RefPicList0 and the indices in the list are simply referred to as refIdxL0 in the Description and the Drawings unless otherwise noted. Similarly, the other reference picture list is simply referred to as RefPicList1 and the indices in the list are simply referred to as refIdxL1 (see the legends to FIG. 3 and NPL 1, 8.2.4.2.3 in 8.2.4 Decoding process for reference picture lists construction for more derails.)

The following will describe the (T) temporal mode and the (S) spatial direct mode in H.264.

Figure 4:
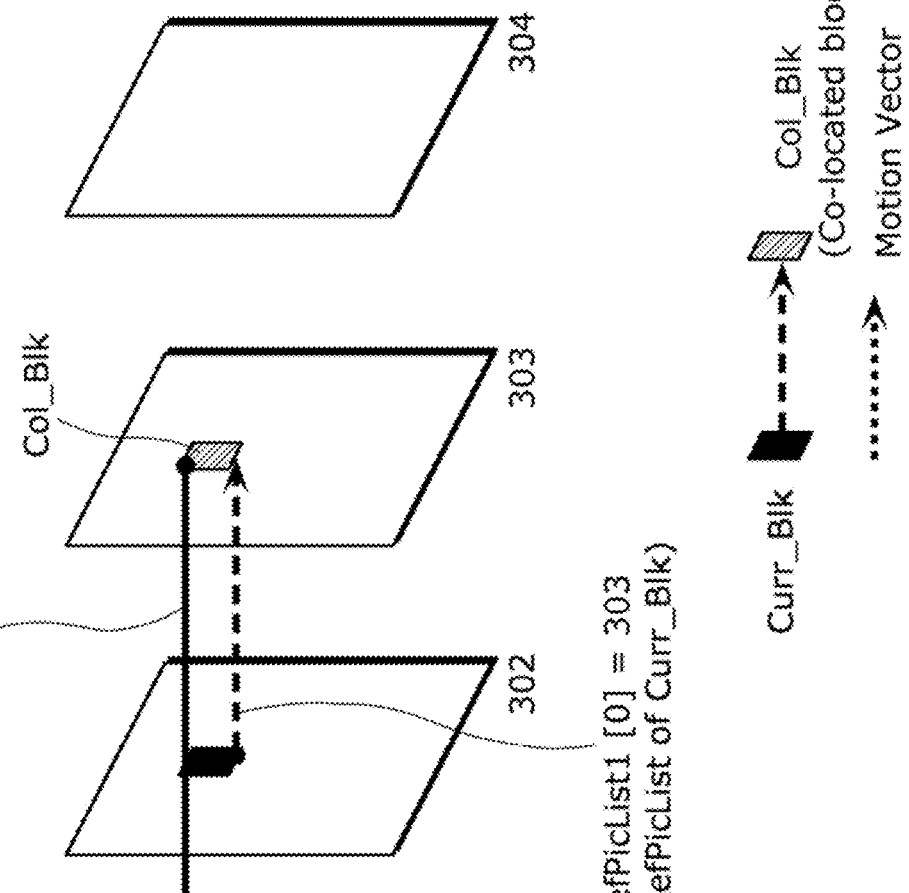
FIG. 4 illustrates information for use in a (T) temporal mode.

FIG. 4 illustrates information for use in the (T) temporal mode.

The hatched block in FIG. 4 represents a co-located block (Col_Blk), which is spatially identical to the current block (but temporally different from the current block). Temporal location of the co-located block is specified by the index having a value of "0" in the RefPicList1 in the other reference picture list 1 in FIG. 3, that is, the co-located block is located in the picture 303. In the list RefPicList1 initialized under the Rule 1, the picture indicated by the index having a value of "0" (that is, the value of RefPicList1[0]) is a picture temporally closest one of the pictures which are in the reference memory and follow the current picture in the display order with exceptional cases in which, for example, the reference memory stores no picture temporally following the current picture.

Next, in the temporal mode, motion vectors mvL0 and mvL1 of a current block to be decoded Curr_Blk represented as a solid black block are derived using "motion data" of the Col_Blk represented as a hatched block. The "motion data" includes the following.

(i) Reference Picture refIdxL0[Refidx] Referenced by the Col_Blk

In this example, the Col_Blk references the picture having a picNum of 301 (this is indicated by the value of RefPicList0[1]).

(ii) Motion Vector mvL0Col in the Reference Picture

In FIG. 4, the dashed arrow in the picture having a picNum of 301 indicates one motion vector mvL0Col to be used for decoding of the Col_Blk.

In the following, dashed arrows in the present Description and the Drawings represent motion vectors. The motion vector mvL0Col indicates a predictive image used for decoding of Col_Blk.

Figure 5A:
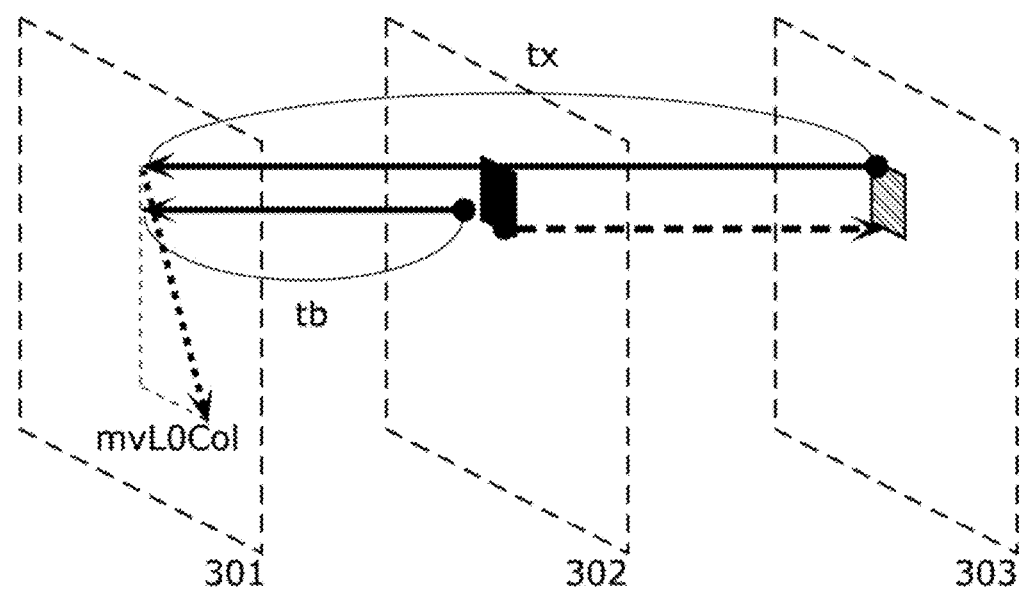
FIG. 5A illustrates a scaling process in the temporal mode, showing a simplified diagram of a co-located block and a motion vector mvL0Col.
Figure 5B:
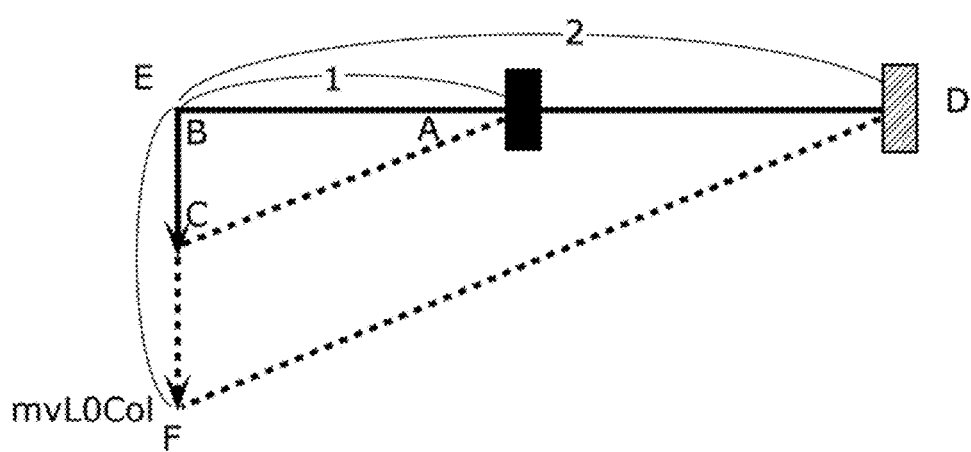
FIG. 5B illustrates a scaling process in the temporal mode using a diagram of concept of the scaling process.

FIG. 5A and FIG. 5B illustrate a scaling process in the temporal mode.

The scaling process is a process for derivation of motion vectors mvL0 and mvL1 of a current block to be decoded Curr_Blk by scaling the value of a motion vector mvL0Col using the ratio between distances from the current block to reference pictures.

FIG. 5A illustrates the reference structure, co-located block, and motion vector mvL0Col in FIGS. 1 to 4 using a simplified diagram.

FIG. 5B illustrates concept of the scaling process.

The scaling process is based on the idea of similarity between a triangle DEF and a triangle ABC as illustrated in FIG. 5B.

The triangle DEF is a triangle for Col_Blk.

The point D is on the Col_Blk. The point E is on a picture referenced by the Col_Blk. The point F is a point where the motion vector mvL0Col starting at the point E has its tip.

The triangle ABC is a triangle for Curr_Blk.

The point A is on a current block to be decoded Curr_Blk. The point B is on a picture referenced by the block Curr_Blk. The point C is a point where the vector to be derived has its tip.

First, in STEP 1, ScaleFactor is derived which is a ratio of (2) a relative distance (tx) from the Col_Blk to a picture referenced by the Col_Blk to (1) a relative distance (tb) from the Curr_Blk to a picture referenced by the Curr_Blk. For example, referring to FIG. 5B, ScaleFactor is a ratio of tb=302−301=1 to tx=303−301=2 (tb/tx), that is, the scaling ratio is 0.5 (½) (or the homothetic ratio is 1:2). Therefore, it is the case that the homothetic ratio of the triangle ABC to the triangle DEF is ½.

$$\text{ScaleFactor} = tb/tx = (302 - 301)/(303 - 301) = 1/2 \quad \text{(STEP 1)}$$

In STEP 2, a vector EF having a magnitude equal to the length of a given side EF is multiplied by the scaling ratio to obtain a vector BC. The vector BC is one of two vectors to be derived, a vector mvL0.

$$mvL0 = \text{ScaleFactor} \times mvL0Col \quad \text{(STEP 2)}$$

In STEP 3, the other vector to be derived, a vector mvL1, is derived using the mvL0 derived in STEP 2 and an inverted mvL0Col.

$$mvL1 = mvL0 - mvL0Col \quad \text{(STEP 3)}$$

FIG. 6 illustrates a relationship between STEPs 1 to 3 and the equations for deriving motion vectors described in 8.4.1.2.3 Derivation process for temporal direct luma motion vector and reference index prediction mode of NPL 1.

FIG. 7 illustrates the other one of the two direct modes, the (S) spatial direct mode.

A current block to be decoded (Curr_Blk) is included in a motion compensation unit block. In this mode, data on a motion vector (this is motion data including a combination of values (motion vector mvLXN and reference index refIdxLXN) as described above, the same applies hereinafter) is obtained for a block N which neighbors the motion compensation unit block (the block N is, for example, a neighboring block A, a neighboring block B, or a neighboring block C).

Among data on a motion vector (hereinafter also referred to as motion data), an item of motion data (refIdxL0 and refIdxL0 and mvL0 and mvL1 corresponding to them, respectively) of a block having the smallest reference index (refIdxLXN) value is used as it is (see equations 8-186 and 8-187 in NPL 1). The reference indices have values of natural numbers including "0" (values of MinPositive values). Specifically, refIdxL0 and refIdxL1 are derived using the following equations, respectively:

$$\text{refIdxL0} = \text{MinPositive}(\text{refIdxL0}A, \text{MinPositive}(\text{refIdxL0}B, \text{refIdxL0}C)) \quad (8\text{-}186); \text{ and}$$

$$\text{refIdxL1} = \text{MinPositive}(\text{refIdxL1}A, \text{MinPositive}(\text{refIdxL1}B, \text{refIdxL1}C)) \quad (8\text{-}187).$$

In the spatial direct mode, items of "motion data" including data on a motion vector mvL0 or mvL1, such as a distance from the current picture to a reference picture (refIdxL0, refIdxL1), is used in a set. Therefore, unlike in the temporal mode, derivation of a motion vector generally does not involve scaling of mvL0 or mvL1 but only references to a reference picture used for the neighboring block.

As described above, derivation of a motion vector mvL0 using ScaleFactor (DistScaleFactor) in the (T) temporal mode involves multiplication of mvL0Col by ScaleFactor. Accordingly, when a motion vector to be handled in decoding is limited to a magnitude such that the motion vector can be represented at a certain bit precision, it is necessary to control generation of a motion vector so that the motion vector obtained as a result of multiplication performed in coding in temporal mode has such magnitude. Such control will increase processing load in coding.

Furthermore, according to the conventional H.264 standard, switching between the (T) temporal mode and the (S) spatial direct mode is allowed only up to once per slice.

For the HEVC standard, use of a merge mode is discussed in which motion vectors are derived using a method more flexible than when the spatial direct mode or the temporal mode is used for each slice in H.264. Here, it is desired to appropriately balance between reduction in processing load and maintenance of coding efficiency for derivation of such motion vectors having a limited magnitude by using these modes in combination with the merge mode for a new standard, the HEVC.

A moving picture coding method according to an aspect of the present disclosure is a moving picture coding method for coding pictures on a block-by-block basis, and includes: selectively adding, to a list, a motion vector of each of one or more corresponding blocks each of which is (i) a block included in a current picture to be coded and spatially neighboring a current block to be coded or (ii) a block included in a picture other than the current picture and temporally neighboring the current block; selecting a motion vector from among the motion vectors in the list, the selected motion vector being to be used for coding the current block; and coding the current block using the motion vector selected in the selecting, wherein in the adding, a scaling process is performed on a first motion vector of the temporally neighboring corresponding block to calculate a second motion vector, whether the calculated second motion vector has a magnitude that is within a predetermined magnitude range or a magnitude that is not within the predetermined magnitude is determined, and the second motion vector is added to the list as the motion vector of the corresponding block when it is determined that the second motion vector has a magnitude that is within the predetermined magnitude range.

In this way, it is possible to limit motion vectors handled in coding and decoding to a certain magnitude such that the motion vectors can be represented at a certain bit precision.

Furthermore, in the adding, when it is determined that the second motion vector has a magnitude that is not within the predetermined magnitude range, the second motion vector is clipped to have a magnitude within the predetermined magnitude range, and a motion vector resulting from the clipping of the second motion vector is added to the list as the motion vector of the corresponding block.

Furthermore, in the adding, when it is determined that the second motion vector has a magnitude that is not within the predetermined magnitude range, the second motion vector is not added to the list.

Furthermore, the list is a merging candidate list which lists the motion vector of the corresponding block and specifying information for specifying a picture referenced by the corresponding block, in the adding, the specifying information is added to the merging candidate list in addition to the motion vector of the corresponding block, in the selecting, a motion vector and specifying information which are to be used for coding the current block are selected from among the motion vectors in the merging candidate list, and in the coding, the current block is coded by generating a predictive picture of the current block using the motion vector and specifying information selected in the selecting.

Furthermore, the list is a motion vector predictor candidate list, in the adding, whether a fourth motion vector has a magnitude that is within a predetermined magnitude range or a magnitude that is not within the predetermined magnitude range is further determined, and the fourth motion vector is added to the motion vector predictor candidate list as a motion predictor vector candidate when it is determined that the fourth motion vector has a magnitude that is within the predetermined magnitude range, the fourth motion vector being calculated by performing a scaling process on a third motion vector of the spatially neighboring corresponding block, in the selecting, a motion vector predictor to be used for coding the current block is selected from the motion vector predictor candidate list, and in the coding, the coding of the current block which includes coding of a motion vector of the current block using the motion vector predictor selected in the selecting is performed.

Furthermore, in the adding, when it is determined that the fourth motion vector has a magnitude that is not within the predetermined magnitude range, the fourth motion vector is clipped to have a magnitude within the predetermined magnitude range, and a motion vector resulting from the clipping of the fourth motion vector is added to the motion vector predictor candidate list as the motion vector predictor candidate.

Furthermore, the predetermined magnitude range is determined based on a bit precision of a motion vector, and the bit precision has either a value specified by one of a profile and a level or by a value included in a header.

Furthermore, a moving picture decoding method according to an aspect of the present disclosure is a moving picture decoding method for decoding pictures on a block-by-block basis, and includes: selectively adding, to a list, a motion vector of each of one or more corresponding blocks each of which is (i) a block included in a current picture to be decoded and spatially neighboring a current block to be decoded or (ii) a block included in a picture other than the current picture and temporally neighboring the current block; selecting a motion vector from among the motion vectors in the list, the selected motion vector being to be used for decoding the current block; and decoding the current block using the motion vector selected in the selecting, wherein in the adding, a scaling process is performed on a first motion vector of the temporally neighboring corresponding block to calculate a second motion vector, whether the calculated second motion vector has a magnitude that is within a predetermined magnitude range or a magnitude that is not within the predetermined magnitude is determined, and the second motion vector is added to the list as the motion vector of the corresponding block when it is determined that the second motion vector has a magnitude that is within the predetermined magnitude range.

In this way, it is possible to limit motion vectors handled in coding and decoding to a certain magnitude such that the motion vectors can be represented at a certain bit precision.

Furthermore, in the adding, when it is determined that the second motion vector has a magnitude that is not within the predetermined magnitude range, the second motion vector is clipped to have a magnitude within the predetermined magnitude range, and a motion vector resulting from the clipping of the second motion vector is added to the list.

Furthermore, in the adding, when it is determined that the second motion vector has a magnitude that is not within the predetermined magnitude range, the second motion vector is not added to the list.

Furthermore, the list is a merging candidate list which lists the motion vector of the corresponding block and specifying information for specifying a picture referenced by the corresponding block, in the adding, the specifying information is added to the merging candidate list in addition to the motion vector of the corresponding block, in the selecting, a motion vector and specifying information which are to be used for decoding the current block are selected from among the motion vectors in the merging candidate list, and in the decoding, the current block is decoded by generating a predictive picture of the current block using the motion vector and specifying information selected in the selecting.

Furthermore, the list is a motion vector predictor candidate list, in the adding, whether a fourth motion vector has a magnitude that is within a predetermined magnitude range or a magnitude that is not within the predetermined magnitude range is further determined, and the fourth motion vector is added to the motion vector predictor candidate list as a motion predictor vector candidate when it is determined that the fourth motion vector has a magnitude that is within the predetermined magnitude range, the fourth motion vector being calculated by performing a scaling process on a third motion vector of the spatially neighboring corresponding block, in the selecting, a motion vector predictor to be used for decoding the current block is selected from the motion vector predictor candidate list, and in the decoding, the decoding of the current block which includes decoding of a motion vector of the current block using the motion vector predictor selected in the selecting is performed.

Furthermore, in the adding, when it is determined that the fourth motion vector has a magnitude that is not within the predetermined magnitude range, the fourth motion vector is clipped to have a magnitude within the predetermined magnitude range, and a motion vector resulting from the clipping of the fourth motion vector is added to the motion vector predictor candidate list as the motion vector predictor candidate.

Furthermore, the predetermined magnitude range is determined based on a bit precision of a motion vector, and the bit precision has either a value specified by one of a profile and a level or by a value included in a header.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments of the present disclosure are specifically described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following exemplary embodiments, structural elements not recited in any one of the independent claims are described as arbitrary structural elements.

Embodiment 1

Figure 8:
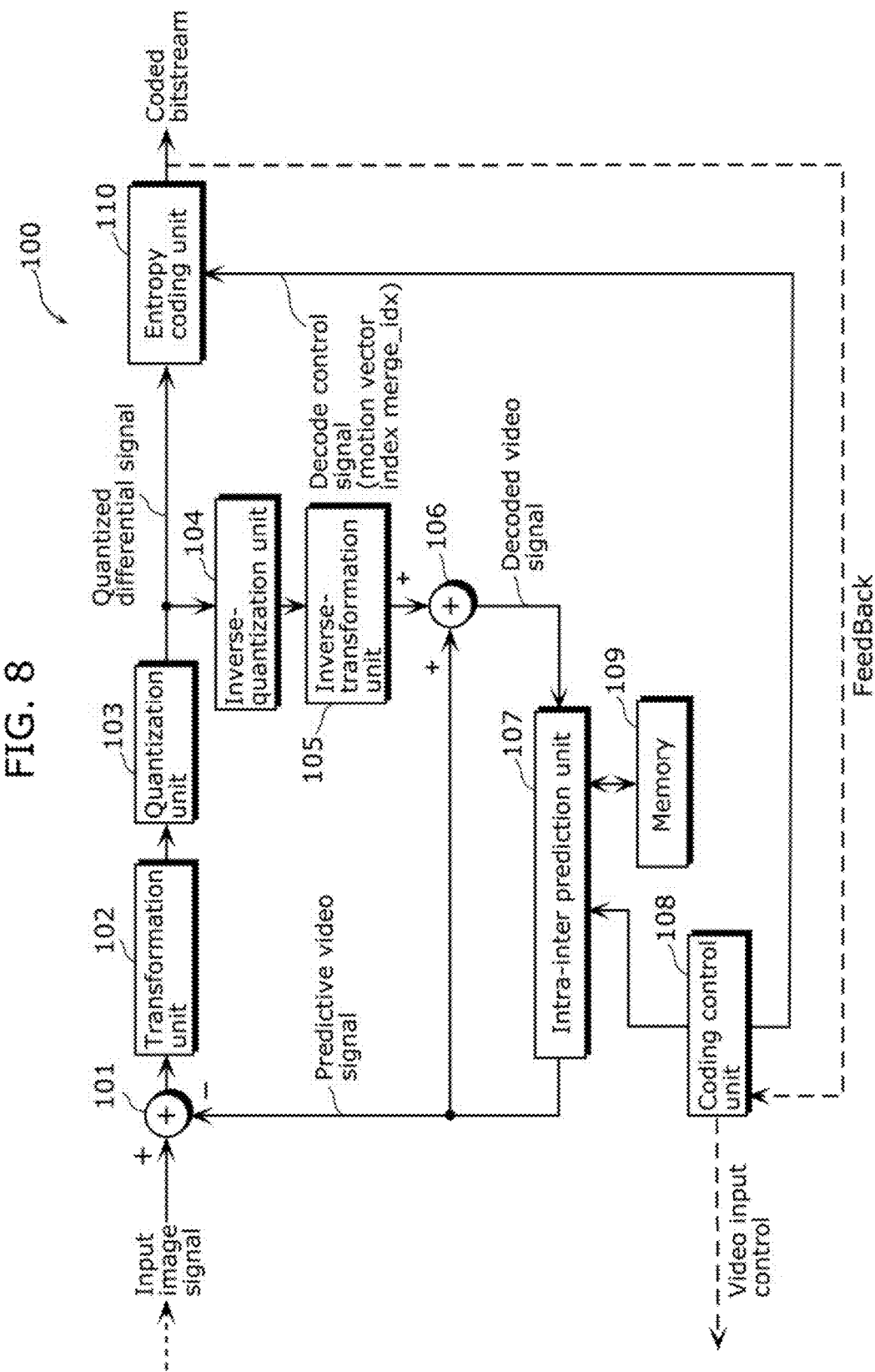
FIG. 8 is a block diagram illustrating a configuration of a moving picture coding apparatus according to Embodiment 1.

FIG. 8 is a block diagram illustrating a configuration of a moving picture coding apparatus according to Embodiment 1.

As illustrated in FIG. 8, a moving picture coding apparatus 100 includes, as its main part, a subtractor unit 101, a transformation unit 102, a quantization unit 103, an entropy coding unit 110, an inverse-quantization unit 104, an inverse-conversion unit 105, an adder unit 106, a memory unit 109, an intra-inter prediction unit 107, and a coding control unit 108.

The subtractor unit 101 outputs a differential signal which is a difference between an input video signal and a predictive video signal.

The transformation unit 102 transforms the differential signal from an image domain into a frequency domain. The quantization unit 103 quantizes the differential signal in a frequency domain as a result of the transformation and outputs the quantized differential signal.

The entropy coding unit 110 entropy-codes the quantized differential signal and a decode control signal and outputs a coded bitstream.

The inverse-quantization unit 104 inverse-quantizes the quantized differential signal. The inverse-transformation unit 105 inverse-transforms the inverse-quantized differential signal from a frequency domain into an image domain and outputs a restored differential signal.

The adder unit 106 adds the restored differential signal and a predictive video signal to generate a decoded video signal.

The intra-inter prediction unit 107 stores the decoded video signal on the basis of a predetermined unit, such as on a per-frame basis or a per-block basis, in the memory 109 and, upon instruction from the coding control unit 108, generates and outputs a predictive video signal (pixel values derived based on the decoded video signal and motion vectors) to be provided to the subtractor unit 101 and the adder unit 106.

Furthermore, the intra-inter prediction unit 107 derives a merging candidate list (mergeCandList) which is a list of candidate motion vectors for use in coding and decoding performed in merge mode. To derive the merging candidate list, the intra-inter prediction unit 107 selectively adds, to the merging candidate list, a motion vector of each corresponding block. Each of the corresponding blocks is (i) a block included in a current picture to be coded and spatially neighboring a current block to be coded or (ii) a block included in a picture other than the current picture and temporally neighboring the current block. Furthermore, the intra-inter prediction unit 107 performs a scaling process on a first motion vector of the temporally neighboring corresponding block to calculate a second motion vector, and determines whether the second motion vector has a magnitude that is within a predetermined magnitude range or a magnitude that is not within the predetermined magnitude range. When determining that the second motion vector has a magnitude that is within the predetermined magnitude range, the intra-inter prediction unit 107 adds, to the merging candidate list, the second motion vector as a motion vector of a corresponding block. The intra-inter prediction unit 107 selects a motion vector to be used for coding of a current block from the merging candidate list. In other words, the scaling process according to Embodiment 1 is performed mainly by the intra-inter prediction unit 107. It should be noted that the intra-inter prediction unit 107 of the moving picture coding apparatus 100 according to Embodiment 1 corresponds to an adding unit and a selecting unit, and the subtractor unit 101, the transformation unit 102, the quantization unit 103, and the entropy coding unit 110 of the moving picture coding apparatus 100 according to Embodiment 1 correspond to a coding unit.

The coding control unit 108 determines control parameters for controlling the processing units in FIG. 8 and for controlling coding of a picture on the basis of a result of a trial, and provided the parameters particularly to the intra-inter prediction unit 107. (The control parameters correspond to a decode control signal). The trial is performed using, for example, a function for reducing the bit length of a coded bitstream represented by a dashed line in FIG. 8. The control parameters for coding a video data (for example, parameters indicating either inter prediction or intra prediction) are thereby determined and outputted. The outputted signal includes motion vector indices, which will be described later.

When the result of the trial is affirmative, the coding control unit 108 determines a merging index (merge_Idx) which is a value indicating that that the scaling process according to Embodiment 1 has been applied to the picture, and includes the merging index in a decode control signal to be outputted. In this case, the quantized differential signal has values derived from a predictive video signal generated using the scaling process according to Embodiment 1.

Figure 9:
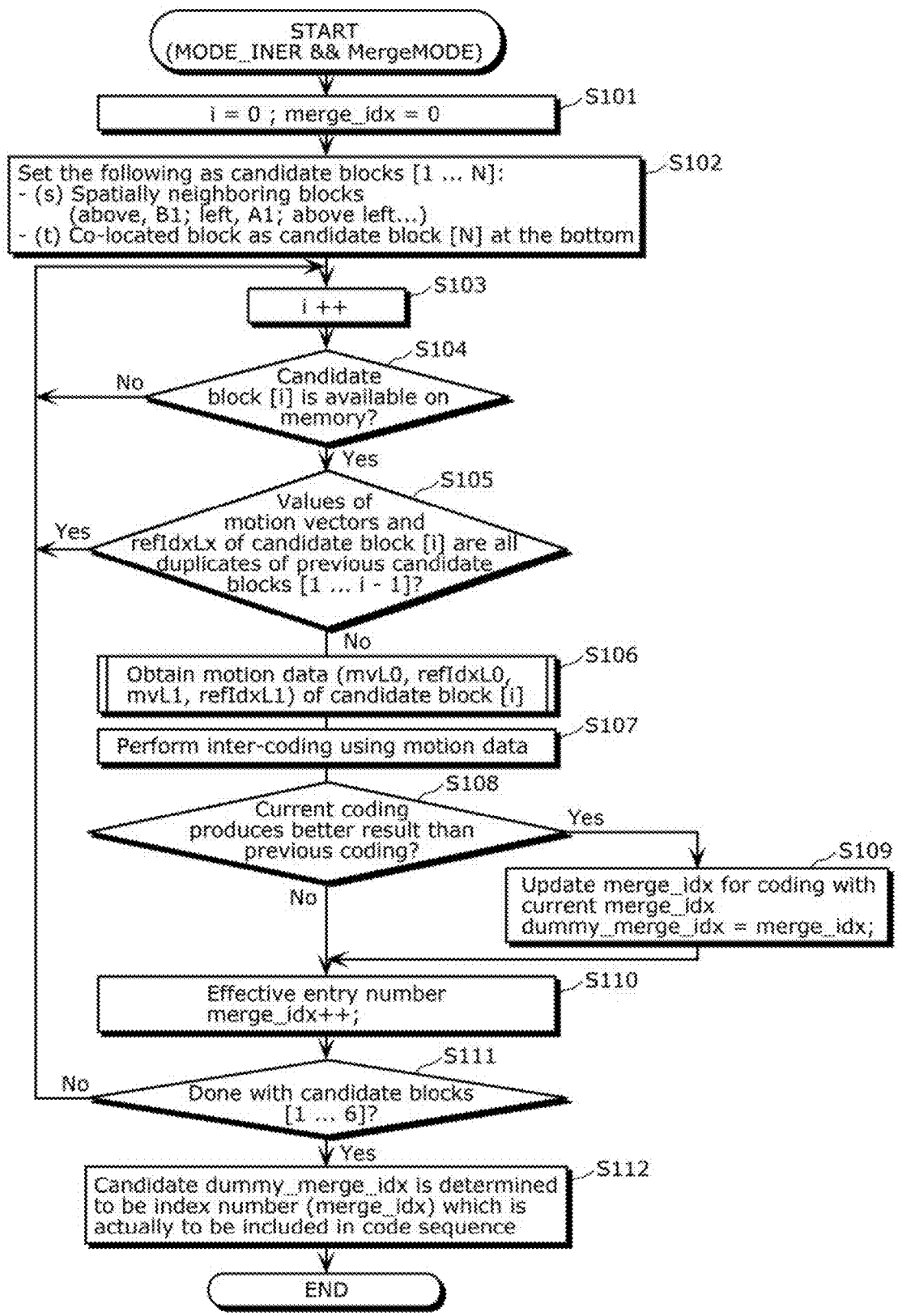
FIG. 9 is a flowchart illustrating operation of the moving picture coding apparatus according to Embodiment 1.

FIG. 9 is a flowchart illustrating operation of the moving picture coding apparatus according to Embodiment 1.

The following will describe operation of coding in merge mode in the case where the coding control unit 108 has determined to (1) inter-code a current block (MODE_INTER) and (2) use the merge mode (MergeMODE) (or obtain a result of use of the merge mode).

The merge mode in HEVC is conceptually equivalent to a direct mode newly provided in the H.264 standard. As with the direct mode in H.264, a motion vector is derived not using a code sequence but using a motion vector of a (S) spatially or (T) temporally different block.

The merge mode and the direct mode in H.264 are different in the following points.

(a) Processing unit: Switching between using and not using the merge mode is possible by switching merge_flag, which can be switched in a prediction unit (PU) less than a slice.

(b) Options: Selection of (S) spatial direct mode or (T) temporal mode is not two-alternative determination. There are more options and the selection is indicated by merge_idx.

Specifically, a merging candidate list (mergeCandList) is derived which is a list of candidate motion vectors for use in coding and decoding in merge mode. A motion vector to be used is indicated by the value of an index (merge_idx) selected from a code sequence in the list.

When the process for the merge mode is started, the coding control unit 108 sets the values of merge_idx and i to "0" (Step S101). The parameter i is conveniently used as a candidate number to distinguish candidates.

The intra-inter prediction unit 107 sets candidate blocks [1 ... N] each of which is of either of the following two types (Step S102). Assume that N=6.

(s) The candidate blocks [1 ... (N−1)] are one or more candidate blocks for spatial direct mode. These candidate blocks [1 ... 5] are distinguished on the basis of the location of each candidate block.

(t) The candidate block [N] is a candidate block for temporal mode. A co-located block appended to the candidate blocks for spatial direct mode has an entry value of "6", which is used as the index of the co-located block. This will be described later using FIG. 10.

In Steps S103 and later, the coding control unit 108 performs a loop process with increments in the value of the parameter i which indicates each candidate (Step S103), to determine a mode for derivation of a motion vector to be outputted. The determined motion vector is appropriate for an objective function to provide high accuracy.

The intra-inter prediction unit 107 determines whether or not the candidate block [i] is available on memory (Step S104). For example, a block positioned below the current block and yet to be coded (or decoded) is not stored in memory, and is therefore determined to be not available.

When a block is determined to be not available (Step S104, No), the intra-inter prediction unit 107 moves on to the next candidate i without changing the value of merge_idx (returns to Step S103).

When a block is determined to be available (Step S104, Yes), the intra-inter prediction unit 107 proceeds to the next step.

Next, the intra-inter prediction unit 107 determines whether motion data (a set of mvL0, mvL1, refIdxL0, and refIdxL1, the same applies hereinafter) of the candidate block [i] is a duplicate of motion data (mvL0, refIdxL0, mvL1, and refIdxL1) already tried with previous candidate blocks [1 ... (i−1)] (Step S105). This determination will be described later using FIG. 12.

When a block is determined to be a duplicate (Step S105, Yes), the intra-inter prediction unit 107 moves on to the next candidate i without changing the value of merge_idx (returns to Step S103).

When a block is determined to be not a duplicate, that is, when the motion data is a new set of motion data items, (Step S105, No), the intra-inter prediction unit 107 proceeds to the next step. A merging candidate list of motion vectors (mergeCandLis) is generated as a result of the determinations as to the availability (Step S104) and duplication (Step S105). This will be described later using FIG. 11.

Next, the intra-inter prediction unit 107 obtains or derives motion data (mvL0, refIdxL0, mvL1, and refIdxL1) of the candidate block [i] (Step S106). Here, when the candidate block [i] is a co-located block intended to be used in temporal mode, the scaling process is performed. The scaling process will be described later using FIG. 14.

Figure 17:
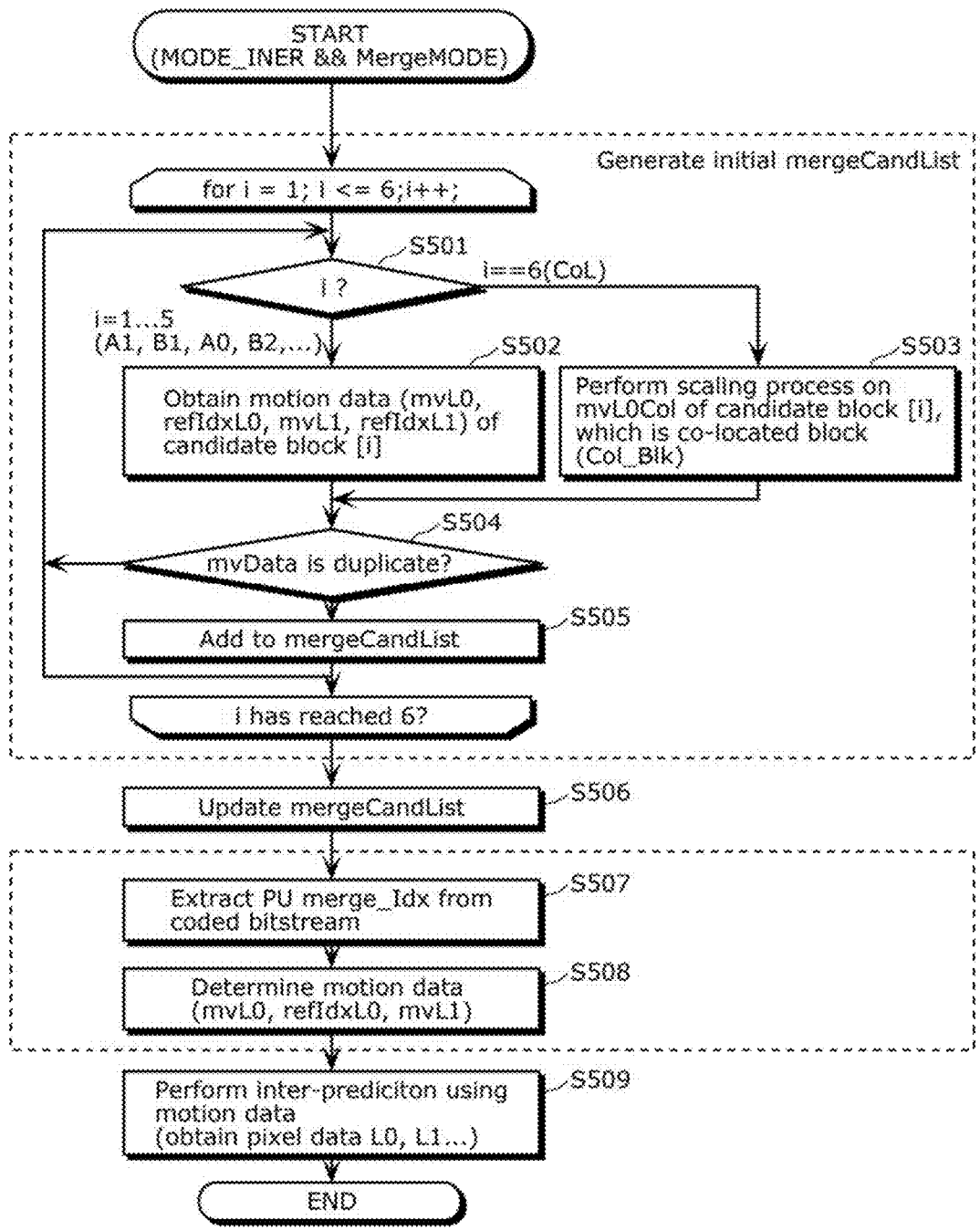
FIG. 17 is a flowchart illustrating operation of the moving picture decoding apparatus according to Embodiment 1.

Although the scaling process is performed when a candidate block [i] turns out to be a co-located block intended to be used in temporal mode in Step S106, the operation of the moving picture coding apparatus is not limited to this. For example, in another possible operation, motion data (mvL0, refIdxL0, mvL1, and refIdxL1) already subjected to the scaling process (this will be described later using FIG. 14) is obtained when a co-located block is added to the list of candidate blocks in Step S102, and the co-located block is not added to the list in Step S105 when the motion data of the co-located block is a duplicate of motion data of any of previous candidate blocks (FIG. 17). In this way, more duplicate motion data of candidate blocks is omitted so that processing load can be reduced and coding efficiency can be improved.

Next, inter coding is performed as a trial by the coding apparatus as a whole using the determined motion data under the control of the coding control unit 108 (Step S107). The coding control unit 108 obtains, for example, a bitstream [i] as a resultant output from the entropy coding unit 110.

The coding control unit 108 determines whether or not the current candidate [i] produces a result better than the results obtained using previous candidates [1 ... (i−1)] (whether or not the current candidate [i] yields a maximum value (or a minimum vale) of a predetermined objective function) from viewpoints such as bitstream length (compression efficiency) or delay in processing (Step S108).

When it is determined that the current candidate [i] produces a result better than the results produced using the previous candidate [1 ... (i−1)] (Step S108, Yes), the current value of merge_idx is stored as a value of merge_idx to be actually used for coding and decoding (Step S109). Briefly, the effective value of merge_idx which yields a more purposive result is stored in a parameter of dummy_merge_idx.

The intra-inter prediction unit 107 has thus obtained the result that the current candidate i is an effective entry. Next, the intra-inter prediction unit 107 increments the value of merge_idx to move on to the next entry (Step S110).

Next, the coding control unit 108 determines whether or not the trial has been performed on all candidate blocks (Step S111).

When it is determined that the process has been performed on all the blocks (the trial has been performed on the co-located block for the (t) temporal mode set as the last candidate block [N] in Step S102) (Step S111, Yes), the coding control unit 108 proceeds to the next step.

When it is determined that the process has not been performed on all the candidate blocks (Step S111, No), the candidate number i is incremented and the trial is performed on the next candidate.

Finally, dummy_merge_idx, which yields a maximum value (or a minimum vale) of a predetermined objective function is determined to be a merging index (merge_idx) to be actually included in a code sequence (Step S112).

This is the operation of coding using the merge mode.

FIG. 10 illustrates merging candidate blocks [1 ... 6] set in Step S102 by the intra-inter prediction unit 107.

The candidate blocks include (s) one or more spatially neighboring blocks ((s) spatially neighboring blocks [1 ... (N−1)] in FIG. 10) and (t) one temporally neighboring block ((t) co-located block [N] in FIG. 10).

In a merging candidate list, the spatially neighboring blocks are listed as a candidate entry (or candidate entries) having merge_idx of less values, in other words, as a candidate entry (or candidate entries) at the top of the list.

The spatially neighboring blocks are located in a direction (S1) horizontal or (S2) vertical from the current PU and neighbors the current PU there as illustrated in FIG. 10.

It should be noted that the neighborhood is determined on the basis of PU which is a unit of motion data to which the same motion vector is applied. In other words, what is determined is whether or not a PU neighbors the CurrentPU which includes the current block Curr_Blk. Blocks B0 to B2 in FIG. 10 are examples of a vertically neighboring block. A PU including any of the blocks is a neighboring PU, and motion data (mvL0, refIdxL0, mvL1, and refIdxL1) of the neighboring PU is used. In FIG. 10, blocks A0 and A1 are examples of a horizontally neighboring block.

The candidate entry having merge_idx of the largest value and located at the bottom of a merging candidate list, in other words, the candidate entry last added to a merging candidate list is a temporally neighboring block. In FIG. 10, the co-located block in a picture indicated by an index value of zero in a reference picture list L1 (or L0 when there is no available reference picture list L1) of a current block is a temporally neighboring block.

FIG. 11 illustrates concept of the merging candidate list (mergeCandList) generated in the process in Steps S103 and later. The "i" (1 . . . 6) on the left of FIG. 11 corresponds to the candidate number i in Step S103 and others.

The entries corresponding to i=[1 . . . 5] are (s) one or more spatially neighboring blocks (A0 . . . B2 in FIG. 10). The entry corresponding to i=6 is (t) one temporally neighboring block ((t) co-located block [N] in FIG. 10).

An effective one of entry numbers of the candidates 1 . . . 6 is merge_idx. Referring to FIG. 11, the candidates corresponding to i=3 and 5 are duplicate motion vectors. More specifically, this indicates that the intra-inter prediction unit 107 has determined in Step S105 that motion data (a set of mvL0, mvL1, refIdxL0, and refIdxL1, the same applies hereinafter) of the candidate block [i] is a duplicate of motion data (mvL0, refIdxL0, mvL1, and refIdxL1) already tried with previous candidate blocks [1 . . . (i−1)]).

FIG. 12 illustrates an example of a duplication determination in Step 105 where it is determined that motion data corresponding to an entry of a candidate block is a duplicate of motion data corresponding to a previous entry.

When motion data of a neighboring block located at B1 which is directly above a current PU is practically determined for a PU which also includes B0 and BN, motion data of the blocks B0 and BN corresponding to the candidate numbers 3 and 5, respectively, is a duplicate of the motion data of a neighboring block B1 which is directly above a current PU. Accordingly, the entries of the blocks B0 and BN are removed from the list. The list mergeCandList is thereby compressed to a list in which the largest value of merge_idx is "2" as illustrated in FIG. 11.

Figure 13:
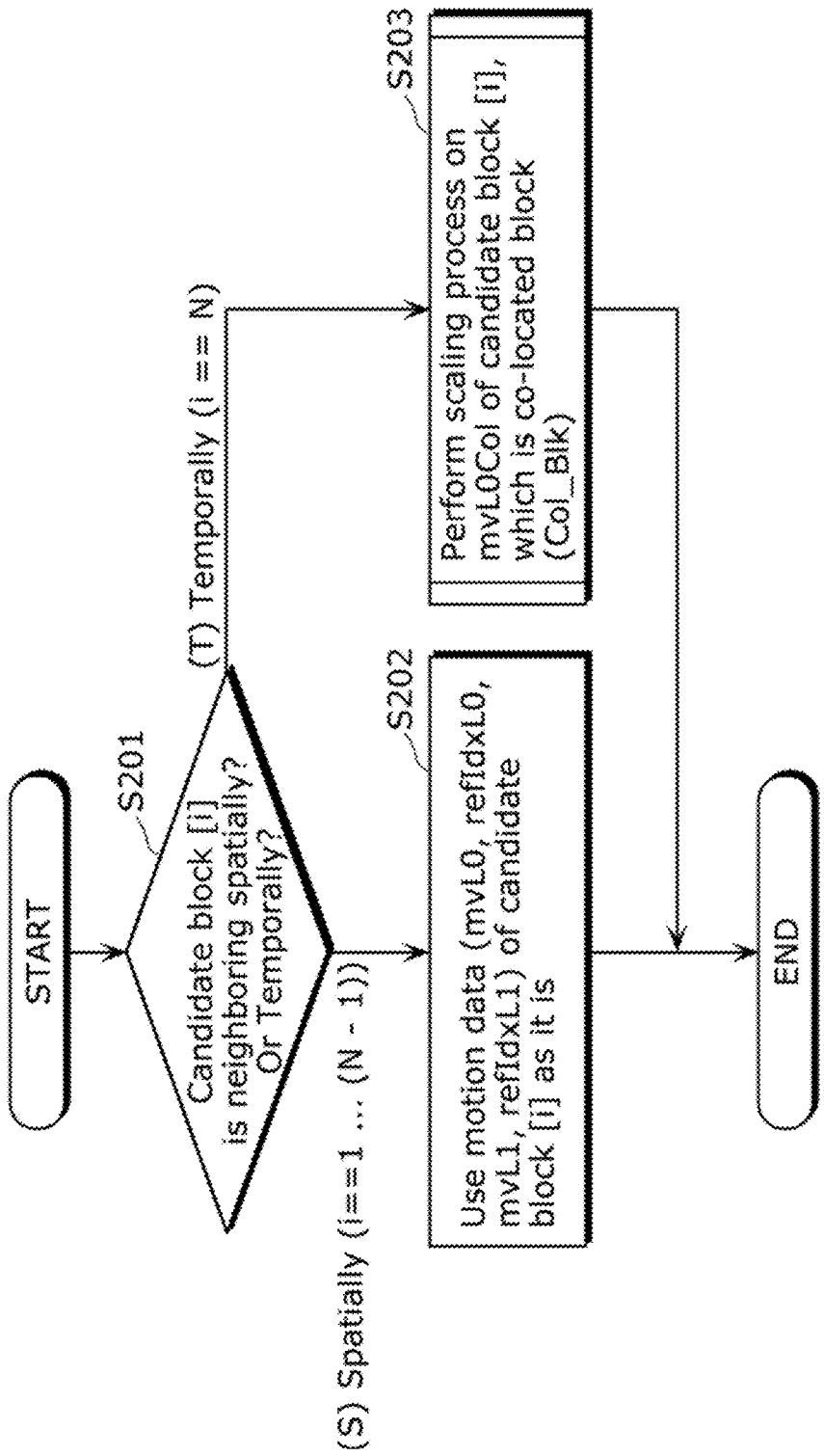
FIG. 13 is a flowchart illustrating a process for obtaining motion data of a merging candidate block [i].

FIG. 13 is a flowchart illustrating a process for obtaining motion data (mvL0, refIdxL0, mvL1, and refIdxL1) of a merging candidate block [i] which is performed in Step S106.

When the process is started, the coding control unit 108 determines whether a neighboring block [i] is a spatially neighboring block or a temporally neighboring block (Step S201).

When the coding control unit 108 determines that the neighboring block [i] is a spatially neighboring block (the value of [i] is one of 1 to 5 in the table in FIG. 11), motion data of the PU including the candidate block [i] is directly determined to be motion data of a current block (Step S202).

When the coding control unit 108 determines that the neighboring block [i] is a temporally neighboring block (the value of [i] is 6 in the table in FIG. 11), mvL0Col of the co-locate block (Col_Blk), which is the candidate block [6], is scaled using a temporal direct scaling process including multiplication (Step S203).

This scaling process will be described below using FIG. 14.

Figure 14:
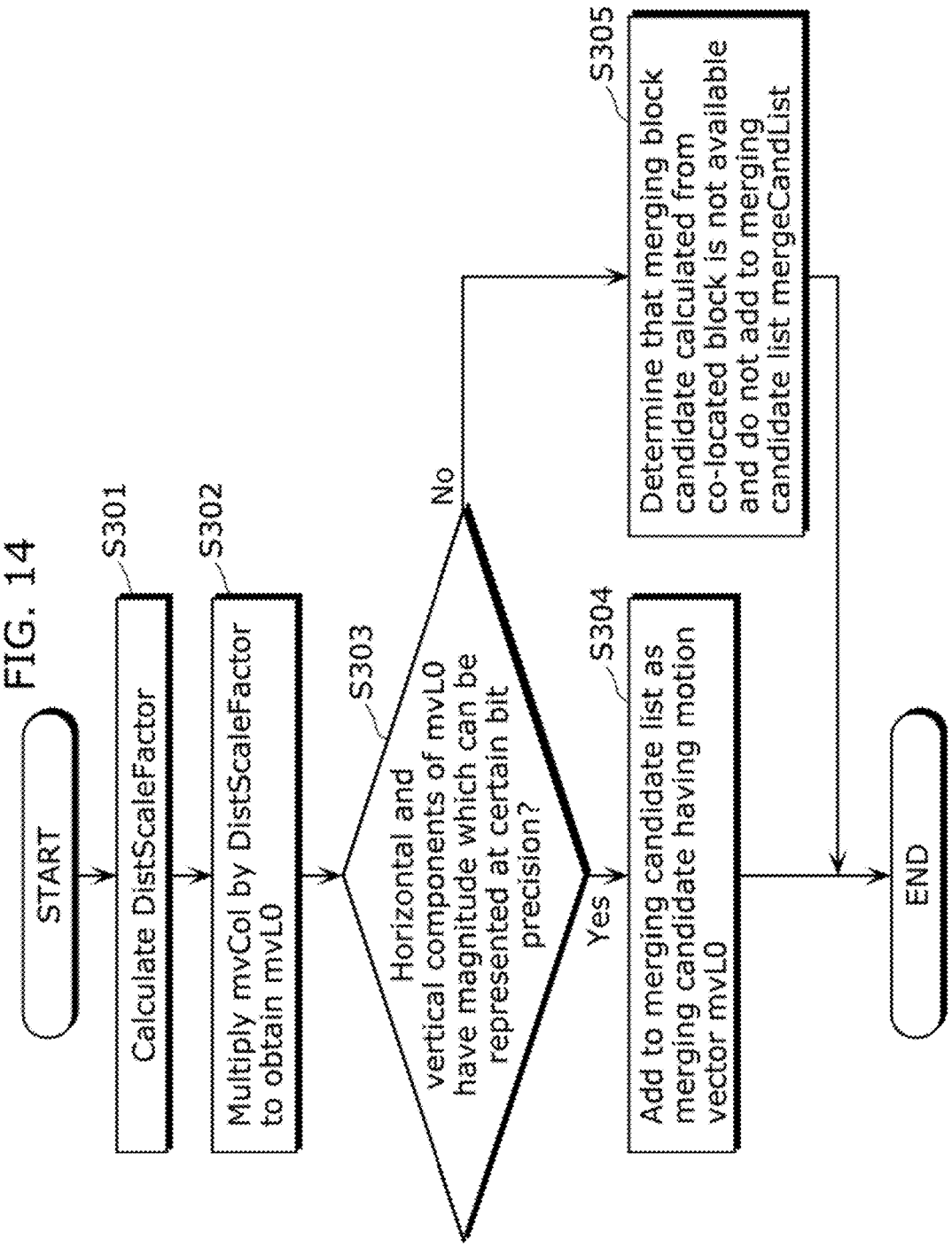
FIG. 14 is a flow chart illustrating an example of a scaling process performed by the inter-intra prediction unit.

FIG. 14 is a flow chart illustrating the scaling process in Step S203.

First, the intra-inter prediction unit 107 calculates DistScaleFactor using a current picture currPicOrField, a reference picture pic0 referenced by a current block, a picture pic1 including a co-located block, and the value of display order of a reference pic0 referenced by the co-located block as illustrated by the equation for Step 1 in FIG. 6 (Step S301). Next, the intra-inter prediction unit 107 calculates a motion vector mvL0 by multiplying a motion vector mvCol of the co-located block by DistScaleFactor as illustrated by the equation for Step 2 in FIG. 6 (Step S302). Next, the intra-inter prediction unit 107 determines whether or not the magnitudes of a horizontal component and a vertical component of the calculated motion vector mvL0 can be represented at a certain bit precision (Step S303). When the result of the determination is true (Step S303, Yes), the intra-inter prediction unit 107 adds a merging block candidate having the calculated motion vector mvL0 to a merging candidate list mergeCandList (Step S304). When the result is false (Step S303, No), the intra-inter prediction unit 107 determines that a merging block candidate calculated from a co-located block is not available and does not add the merging block candidate to a merging candidate list mergeCandList (Step S305).

In this way, when a motion vector resulting from the scaling process has too large a value to be represented at a certain bit precision, a merging block candidate having the motion vector is not added to a merging candidate list. This makes it possible to limit motion vectors to be handled in coding and decoding to a magnitude which can be represented at the certain bit precision. For example, assume that the certain bit precision is 16 bits. In this case, a merging block having a motion vector mvL0 obtained as a result of the scaling process is not added to a merging candidate list when either the horizontal component or the vertical component of the motion vector mvL0 has a value not within the range from −32768 to +32767. In this way, it is possible to limit motion vectors to be handled in coding and decoding to a certain magnitude such that the motion vectors can be represented at a bit precision of 16 bits.

The present invention is not limited to above-described example for Embodiment 1 in which both the horizontal component and the vertical component of a motion vector are limited to a magnitude which can be represented at a bit precision of 16 bits. For example, assume the case that the horizontal component is limited to a magnitude which can be represented at a bit precision of 16 bits and the vertical component is limited to a magnitude which can be represented at a bit precision of 14 bits. In this case, a merging block candidate having a motion vector mvL0 obtained as a result of the scaling process is not added to a merging candidate list when it is determined that the horizontal component mvL0 is not within the range from −32768 to +32767 or the vertical component of the motion vector is not within the range from −8192 to 8191. In this way, it is possible to limit the horizontal component of a motion vector to one magnitude and the vertical component of the motion vector to another magnitude.

The present invention is not limited to the above-described example for Embodiment 1 in which a motion vector mvL0 of a reference picture list L0 is calculated by the scaling process. The scaling process is applicable also to calculation of a motion vector mvL1 of a reference picture list L1.

The present invention is not limited to above-described Embodiment 1 in which a merging block candidate calculated from a co-located block is not added to a merging candidate list when the merging block candidate has a motion vector mvL0 which is calculated by multiplying a motion vector mvCol of the co-located block by DistScaleFactor in Step S302 and has a horizontal component and a vertical component either of which has too large a value to be represented at a certain bit precision. For example, when a co-located block is bi-predictive, a merging block candidate may be calculated by performing the process from Steps S302 to S305 using the other motion vector of the co-located block as mvCol. In this way, excessive reduction in the number of merging block candidates calculated from co-located blocks can be avoided, so that coding efficiency can be increased.

Figure 15:
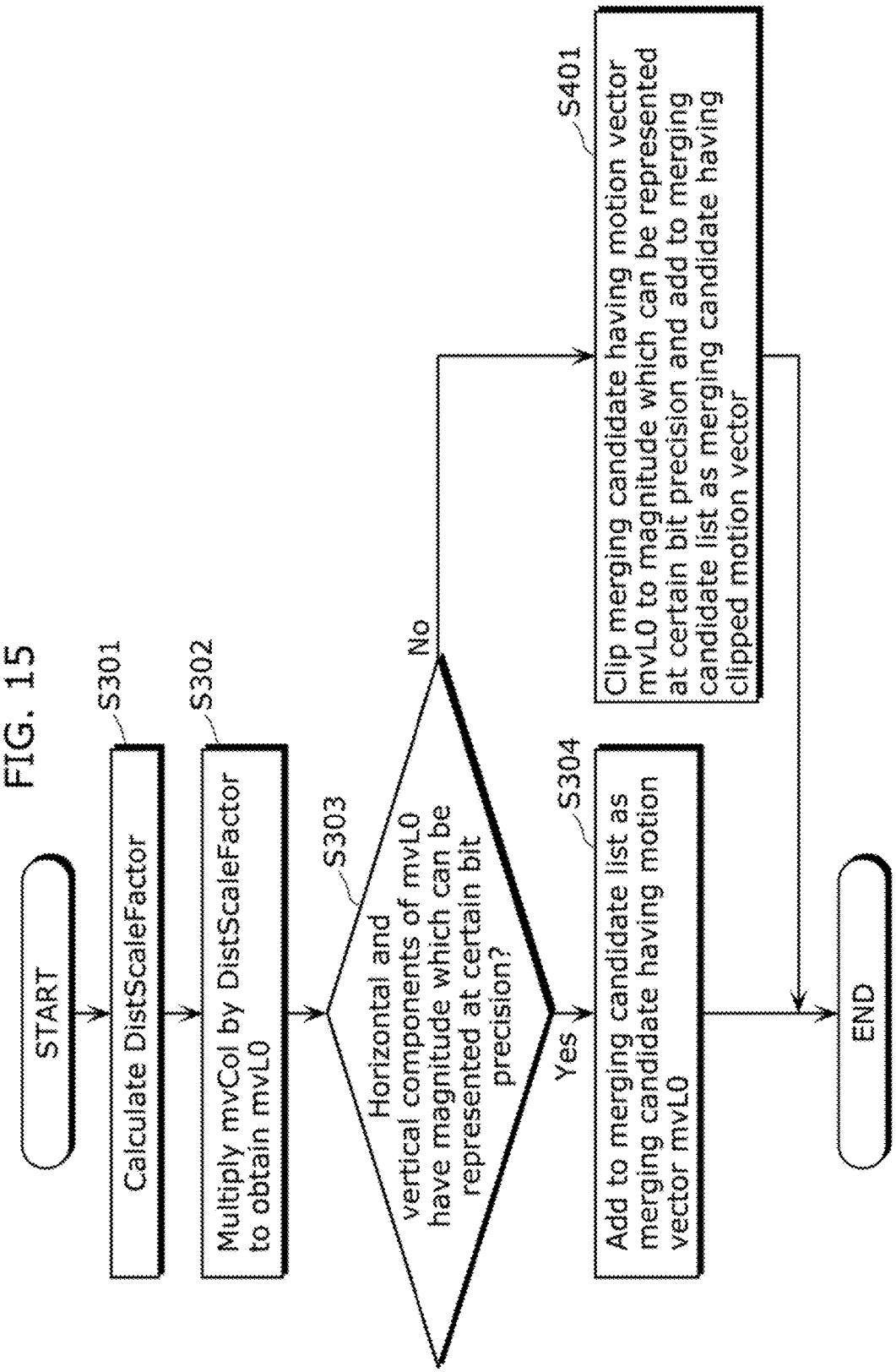
FIG. 15 is a flow chart illustrating another example of the scaling process performed by the inter-intra prediction unit.

The present invention is not limited to above-described Embodiment 1 in which a merging block candidate calculated from a co-located block is not added to a merging candidate list in Step S305 when either the horizontal component or the vertical component of a motion vector mvL0 has too large a value to be represented at a certain bit precision. For example, as illustrated in Step S401 in FIG. 15, the horizontal component or the vertical component of the motion vector mvL0 may be clipped so that its value can be represented at a certain bit precision, and a merging block candidate having the clipped motion vector may be added to a merging candidate list. For a specific example, assume that the certain bit precision is 16 bits. In this case, when a motion vector obtained by the scaling process has a horizontal component having a value greater than +32767, a merging block candidate can be calculated using a motion vector having a horizontal component of +32767 as a result of clipping. When a motion vector obtained by the scaling process has a horizontal component having a value less than −32768, a merging block candidate can be calculated using a motion vector having a horizontal component of −32768 as a result of clipping.

The present invention is not limited to above-described example for Embodiment 1 in which the magnitude of motion vectors is limited to a magnitude based on a fixed bit precision. For example, a flag and a bit precision for limiting motion vectors may be additionally indicated in a header such as a sequence parameter set (SPS), a picture parameter set (PPS), and a slice header, and limiting values for motion vectors may be changed for each sequence, picture, or slice according to the flag and bit precision. Optionally, limiting values for motion vectors may be changed according to a profile or a level which specifies a bit precision of a motion vector.

The following will describe a moving picture decoding apparatus which restores a moving picture from a bitstream coded by the moving picture coding apparatus according to Embodiment 1.

Figure 16:
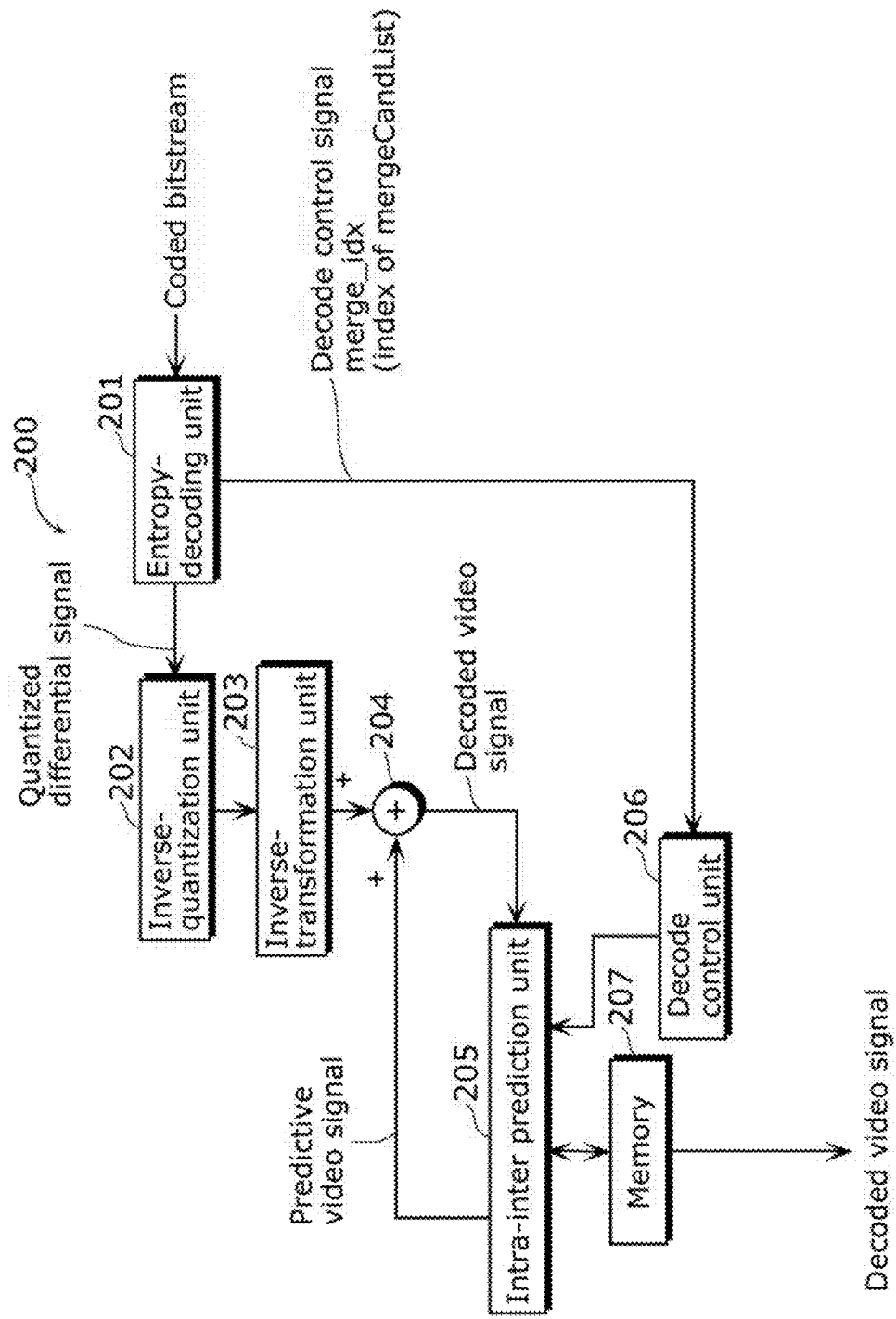
FIG. 16 is a block diagram illustrating a configuration of a moving picture decoding apparatus according to Embodiment 1.

FIG. 16 is a block diagram illustrating a configuration of a moving picture decoding apparatus according to Embodiment 1.

A moving picture decoding apparatus 200 decodes an input coded bitstream and outputs decoded picture signals buffered in a memory (a memory for decoded pictures) in display order with predetermined timing.

As illustrated in FIG. 16, the moving picture decoding apparatus 200 includes, as its main part, an entropy decoding unit 201, an inverse-quantization unit 202, an inverse-transformation unit 203, an adder unit 204, a memory 207, an intra-inter prediction unit 205, and a decoding control unit 206. Each constituent element having the same name as that in the moving picture coding apparatus illustrated in FIG. 8 has a corresponding functionality.

The entropy decoding unit 201 entropy-decodes an input coded bitstream and outputs a quantized differential signal, a decode control signal, and others.

The inverse-quantization unit 202 inverse-quantizes the quantized differential signal obtained by the entropy decoding. The inverse-transformation unit 203 inverse-transforms a differential signal obtained by the inverse-quantizing from a frequency domain into an image domain and outputs restored differential signal.

The adder unit 204 adds the restored differential signal and a predictive video signal to generate a decoded video signal.

The intra-inter prediction unit 205 stores the decoded video signal on the basis of a predetermined unit, such as on a per-frame or per-block basis, in the memory 207 and, upon instruction from the decoding control unit 206, generates and outputs a predictive video signal (pixel values derived based on the decoded video signal and motion vectors) to be provided to the adder unit 204.

As with the moving picture coding apparatus 100, the scaling process according to Embodiment 1 is performed by the intra-inter prediction unit 205. It should be noted that the intra-inter prediction unit 205 of the moving picture decoding apparatus 200 according to Embodiment 1 corresponds to an adding unit and a selecting unit, and the entropy decoding unit 201, the inverse-quantization unit 202, the inverse-transformation unit 203, the adder unit 204, etc. collectively correspond to a decoding unit.

The decoding control unit 206 obtains control parameters to use for control of the processing unit in FIG. 16 and decoding of pictures from the decoding control signal decoded by the entropy decoding unit 201. The decoding control information in a coded bitstream includes the merging index (merge_idx) determined in Step S112 illustrated in FIG. 9.

FIG. 17 is a flowchart illustrating operation of the moving picture decoding apparatus according to Embodiment 1.

The following will describe operation to be performed in the case where the decoding control unit 206 has determined, from information indicated by a decode control signal, that a current block (Curr_Blk) (or a prediction unit PU block including the current block) is inter-coded (MODE_INTER) using merge mode (MergeMODE).

First, the intra-inter prediction unit 205 locally generates a merging candidate list (mergeCandList) illustrated in FIG. 11. To locally generate a merging candidate list means that the intra-inter prediction unit 205 generates a merging candidate list using the same method as the moving picture coding apparatus 100, without referencing information obtained from a coded bitstream.

The parameter "i=1 . . . 6" has the same definition as "i" in FIG. 11.

The intra-inter prediction unit 205 performs the process from Steps S501 to S505 for the candidate block number i which ranges from 1 to 6. The intra-inter prediction unit 205 identifies the candidate block number i (Step S501). When the candidate block number i is one of 1 to 5, the intra-inter prediction unit 205 obtains motion data of spatial neighboring blocks (Step S502).

When the candidate block number i is 6, the intra-inter prediction unit 205 performs the scaling process using motion data of a co-located block using the same method as in Step S203 in FIG. 13 (Step S503).

Next, the intra-inter prediction unit 205 determines whether or not the motion data obtained in Step S502 or Step S504 is a duplicate of motion data in any entry above in mergeCandList (Step S504).

When it is determined that the motion data is a duplicate (Step S504, Yes), the intra-inter prediction unit 205 moves on to the candidate block number i incremented to the next value.

When it is determined that motion data is not a duplicate (Step S504, No), the intra-inter prediction unit 205 appends the obtained motion data to the merging candidate list (mergeCandList) (Step S505).

An initial merging candidate list (mergeCandList) is thus generated by the process from Steps S501 to S505.

Next, when a predetermined condition is satisfied, the intra-inter prediction unit 205 updates the merging candidate list (mergeCandList) (Step S506). FIG. 18 illustrates an example process for the updating, which is performed under a rule implicitly shared with a corresponding moving picture coding apparatus. (a) in FIG. 18 illustrates an generated initial merging candidate list (mergeCandList). (b) in FIG. 18 illustrates a merging candidate list after being updated. In the example illustrated in (b) in FIG. 18, a candidate having a merging index (merge_idx) of "0" (mvL0_A, ref0) and a candidate having a merging index of "1" (mvL1_B, ref0) are combined to generate a candidate having a merging index (merge_idx) of "2" (mvL0_A, ref0, mvL1_B, ref0).

In the following, a selection for merge mode is made for motion vectors mvL0 and mvL1 using the list.

The entropy decoding unit 201 entropy-decodes merge_Idx, and the intra-inter prediction unit 205 receives the value of the merge_Idx (Step S507).

Next, the intra-inter prediction unit 205 selects motion data to use in the merge mode indicated by the value of the merge_Idx from the candidates in the merging candidate list (Step S508).

Finally, the intra-inter prediction unit 205 obtains pixel data (pixelsL0 and pixelsL1) of pixels at positions indicated by the motion vectors mvL0 and mvL1 in the selected motion data (mvL0, refIdxL0, mvL1, refIdxL1), and derives a predictive video signal using the pixel data (Step S509).

In this way, when a motion vector resulting from the scaling process has too large a value to be represented at a certain bit precision, a merging block candidate having the motion vector is not added to a merging candidate list. This makes it possible to limit motion vectors to be handled in coding and decoding to a magnitude which can be represented at the certain bit precision.

The present invention is not limited to above-described Embodiment 1 in which after the scaling process in Step S302 in FIG. 14, whether or not the magnitude of the calculated motion vector can be represented at a certain bit precision is determined. Alternatively, for example, whether or not the magnitude of the motion vector mvL0 selected according to merge_idx in Step S508 in FIG. 17 can be represented within a certain length of bits may be determined. Furthermore when it is determined that the magnitude cannot be represented at a certain bit precision, the motion vector may be clipped so as to have a magnitude which can be represented at the certain bit precision.

Furthermore, the technique disclosed in Embodiment 1 is applicable not only to the case where the magnitude of a motion vector after the scaling process using the merge mode specified in the HEVC discussed in NPL 2 is limited so that it can be represented at a certain bit precision. It is also applicable to the case where a motion vector predictor candidate is derived using the AMVP specified in the HEVC discussed in NPL 2.

FIG. 19A illustrates a motion vector predictor mvpLX in HEVC described in NPL 2. FIG. 19B illustrates a candidate list mvpListLX (mvpListL0 and mvpListL1) for the motion vector predictor mvpLX.

The motion vector predictor mvpLX is used for derivation of a difference motion vector mvdLX which is a difference from a motion vector mvLX derived by motion estimation as illustrated in FIG. 19A. Then, the difference motion vector mvdLX is coded. The value of mvp_idx_l0 in FIG. 19B corresponds to the value of mvp_idx_lX which is coded (or extracted by a corresponding decoding apparatus). Motion data of mvpListLXN[mvp_idx_lX] identified by an index value (0, 1, or 2) is a motion vector predictor mvp (predictor). N in FIG. 19A and FIG. 19B indicates a spatial or temporal position of a block whose motion vector has a value to be used as a predicted value of a motion vector.

FIG. 20 illustrates predictor candidate blocks or a predictor candidate block indicated by the value of N (A, B, or Col) shown in FIG. 19B. The solid black block in FIG. 20 is a current block to be coded (or decoded) Curr_Blk. The block is included in a picture having a picture number of picNum 302. The hatched block in FIG. 20 is located at the position indicated by approximately identical spatial coordinates (x, y) as the current block to be decoded Curr_Blk (or a prediction unit PU block including the current block) but in a picture having a different picNum (temporally different), that is, what is called a co-located block (Col_Blk). In this example, assume that Col_Blk is located in a picture not having a picture number of a picNum 302 but having a picture number of picNum 303. In HEVC, motion vectors mvL0A, mvL0B, and mvL0Col (or mvL1A, mvL1B, and mvL1Col) of the blocks N_Blk (A_Blk, B_Blk, Col_Blk) at the positions A, B, and Col, respectively, are multiplied by DistScaleFactor, and resulting motion vector predictors mvpL0 and mvpL1 are used as predictor candidates.

In Embodiment 1, whether or not the magnitude of each of the motion vector predictors calculated by the multiplication can be represented at a certain bit precision is determined. When the result of the determination is false, the motion vector predictor is not added to a list of motion vector predictor candidates. In this way, it is possible to limit a motion vector predictor or a difference motion vector calculated from a motion vector and a motion vector predictor of a current block to be coded to a magnitude which can be represented at a certain bit precision is determined. When the motion vector predictor calculated by the multiplication has a magnitude which cannot be represented at the certain bit precision, a motion vector predictor obtained by clipping the motion vector predictor so as to have a magnitude which can be represented at a certain bit precision may be added instead to the list of motion vector predictor candidates.

Embodiment 1 has been described by way of example, and the scope of the claims of the present application is not limited to Embodiment 1. Those skilled in the art will readily appreciate that various modifications may be made in these exemplary embodiments and that other embodiments may be obtained by arbitrarily combining the constituent elements of the embodiments without materially departing from the novel teachings and advantages of the subject matter recited in the appended Claims.

Accordingly, all such modifications and other embodiments are included in the present disclosure.

Each of the constituent elements in each of the above-described embodiments may be configured in the form of an exclusive hardware product, or may be realized by executing a software program suitable for the structural element. The constituent elements may be implemented by a program execution unit such as a CPU or a processor which reads and executes a software program recorded on a recording medium such as a hard disk or a semiconductor memory. Here, the software program for realizing the moving picture coding apparatus or the moving picture decoding apparatus according to Embodiment 1 is a program described below.

Specifically, the program causes a computer to execute a method for coding pictures on a block-by-block basis, the method including: selectively adding, to a list, a motion vector of each of one or more corresponding blocks each of which is (i) a block included in a current picture to be coded and spatially neighboring a current block to be coded or (ii) a block included in a picture other than the current picture and temporally neighboring the current block; selecting a motion vector from among the motion vectors in the list, the selected motion vector being to be used for coding the current block; and coding the current block using the motion vector selected in the selecting, wherein in the adding, a scaling process is performed on a first motion vector of the temporally neighboring corresponding block to calculate a second motion vector, whether the calculated second motion vector has a magnitude that is within a predetermined magnitude range or a magnitude that is not within the predetermined magnitude is determined, and the second motion vector is added to the list as the motion vector of the corresponding block when it is determined that the second motion vector has a magnitude that is within the predetermined magnitude range.

Furthermore, the program causes a computer to execute a method for decoding pictures on a block-by-block basis, the method including: selectively adding, to a list, a motion vector of each of one or more corresponding blocks each of which is (i) a block included in a current picture to be decoded and spatially neighboring a current block to be decoded or (ii) a block included in a picture other than the current picture and temporally neighboring the current block; selecting a motion vector from among the motion vectors in the list, the selected motion vector being to be used for decoding the current block; and decoding the current block using the motion vector selected in the selecting, wherein in the adding, a scaling process is performed on a first motion vector of the temporally neighboring corresponding block to calculate a second motion vector, whether the calculated second motion vector has a magnitude that is within a predetermined magnitude range or a magnitude that is not within the predetermined magnitude is determined, and the second motion vector is added to the list as the motion vector of the corresponding block when it is determined that the second motion vector has a magnitude that is within the predetermined magnitude range.

Embodiment 2

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

FIG. 21 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 21, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA).

Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 22:
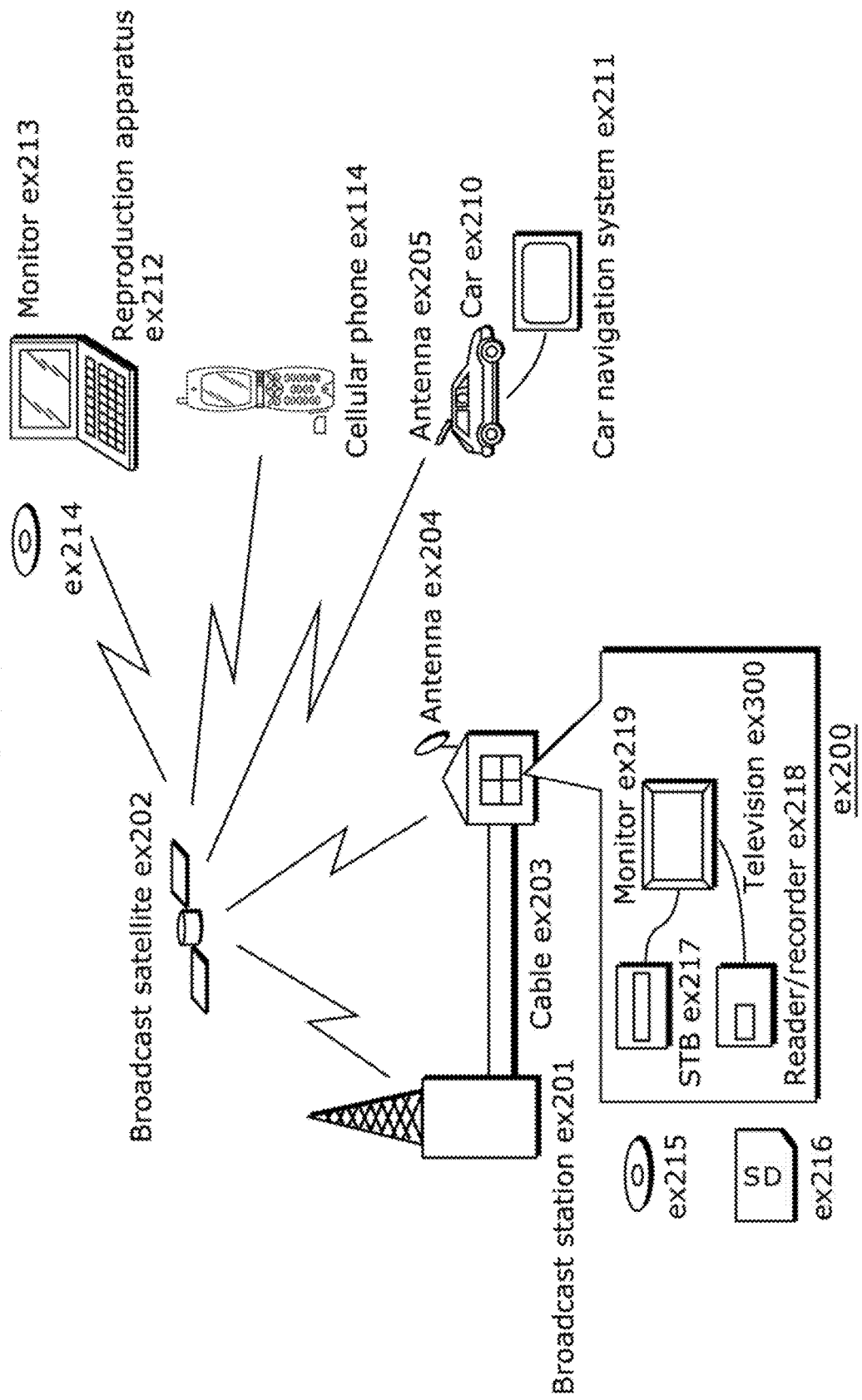
FIG. 22 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 22. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 23:
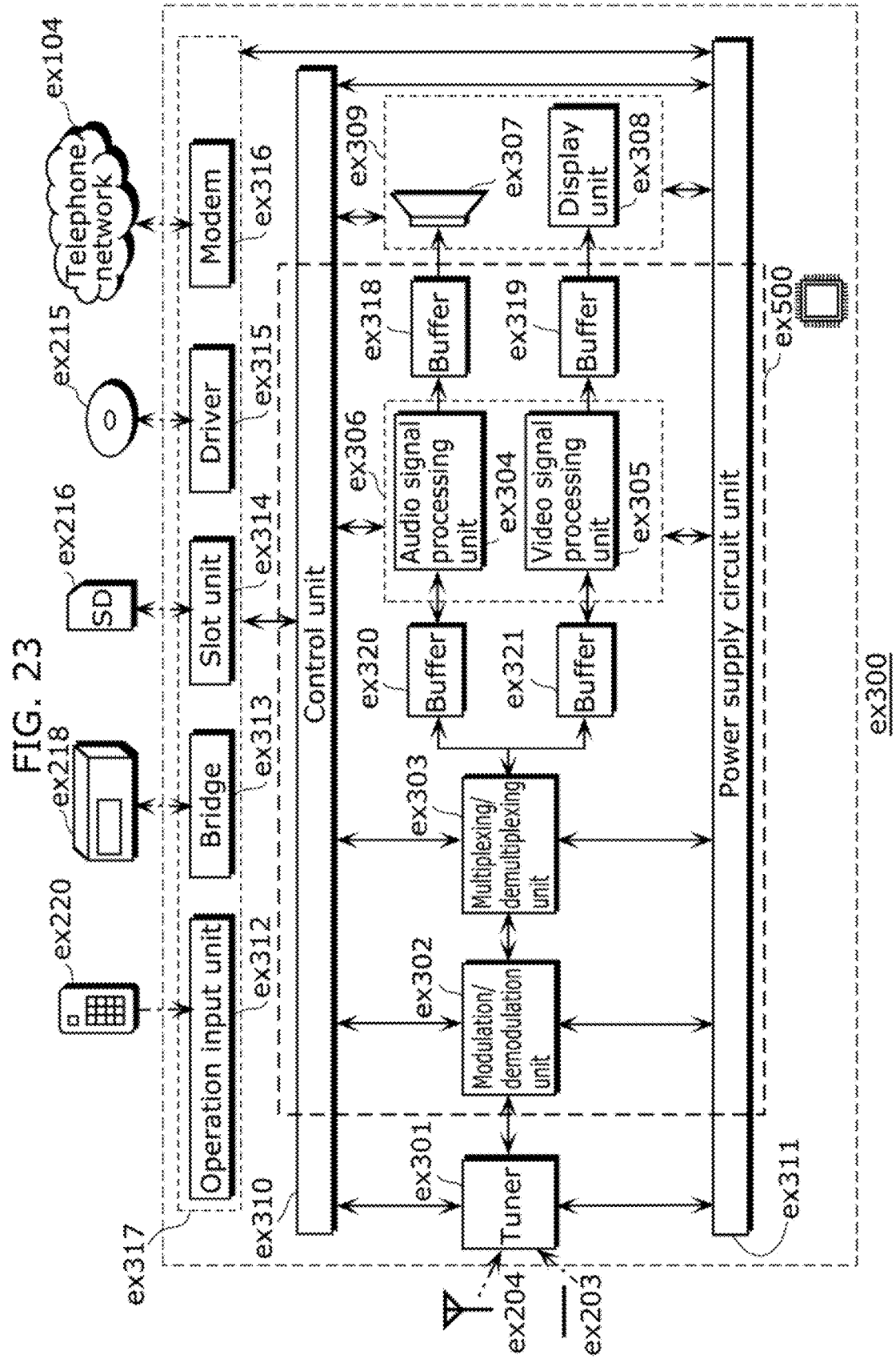
FIG. 23 shows a block diagram illustrating an example of a configuration of a television.

FIG. 23 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 24:
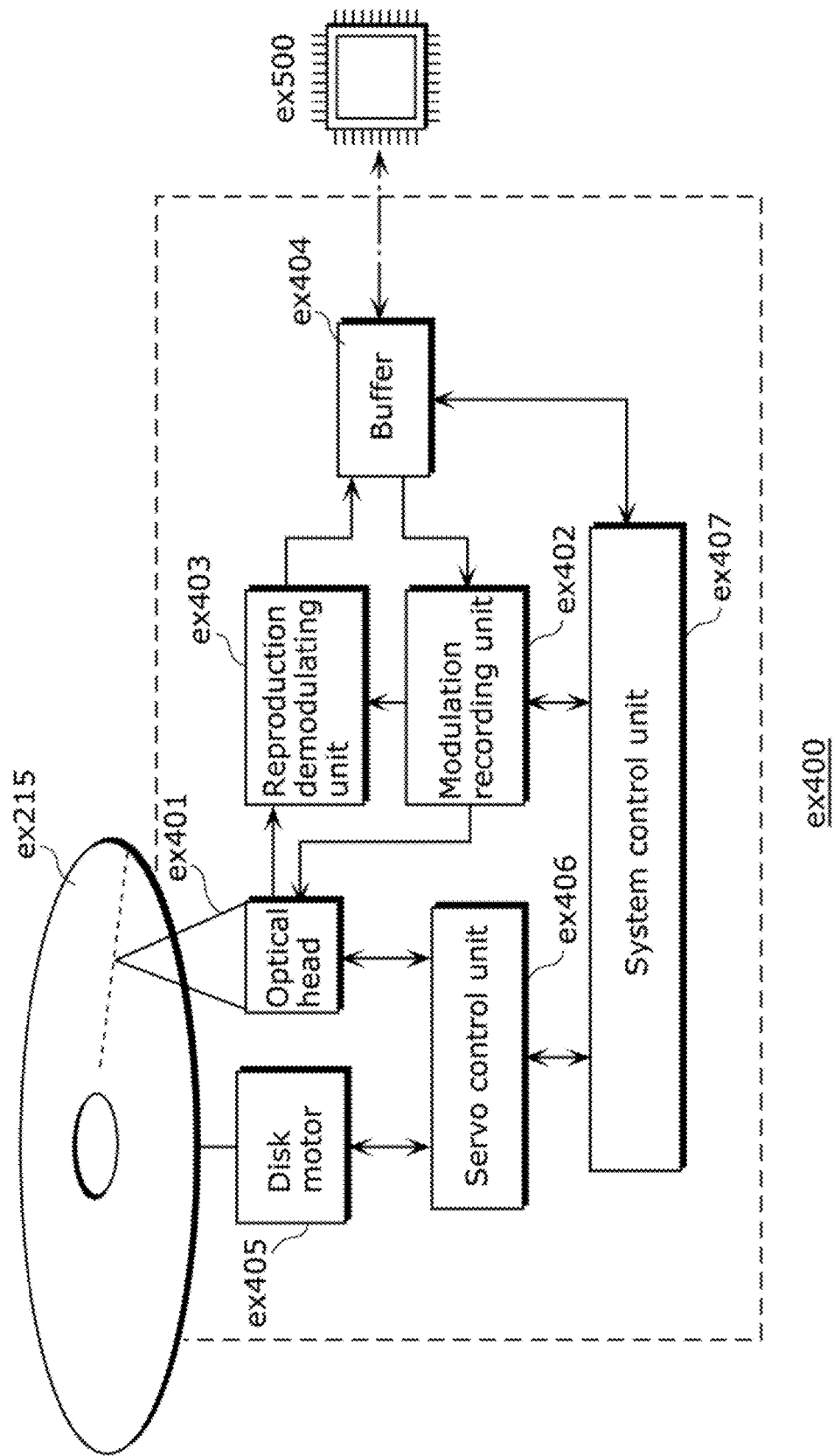
FIG. 24 shows a block diagram illustrating an example of a configuration of an information reproducing/recording unit that reads and writes information from and on a recording medium that is an optical disk.

As an example, FIG. 24 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 25:
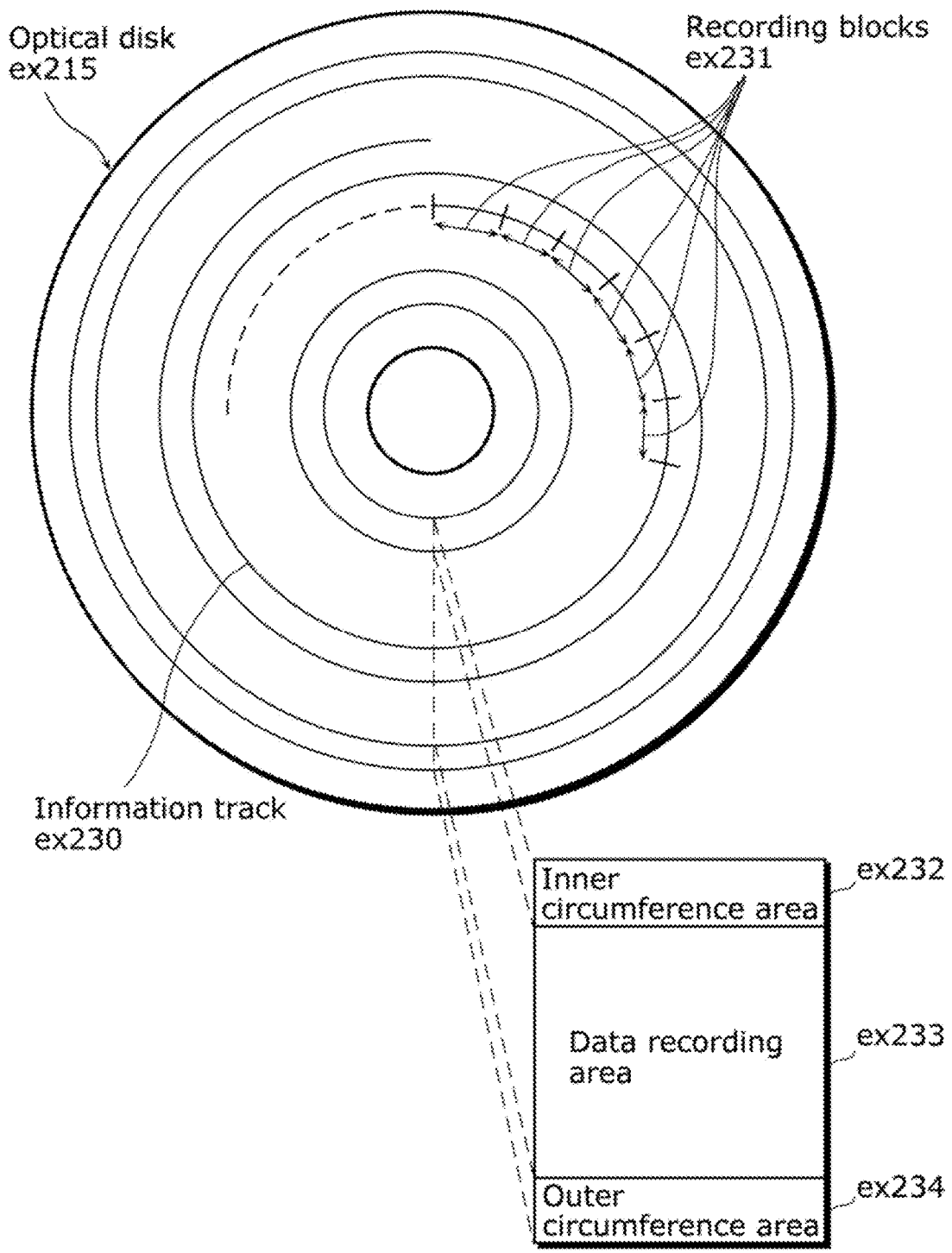
FIG. 25 shows an example of a configuration of a recording medium that is an optical disk.

FIG. 25 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 23. The same will be true for the configuration of the computer ex111, the cellular phone ex114, and others.

Figure 26A:
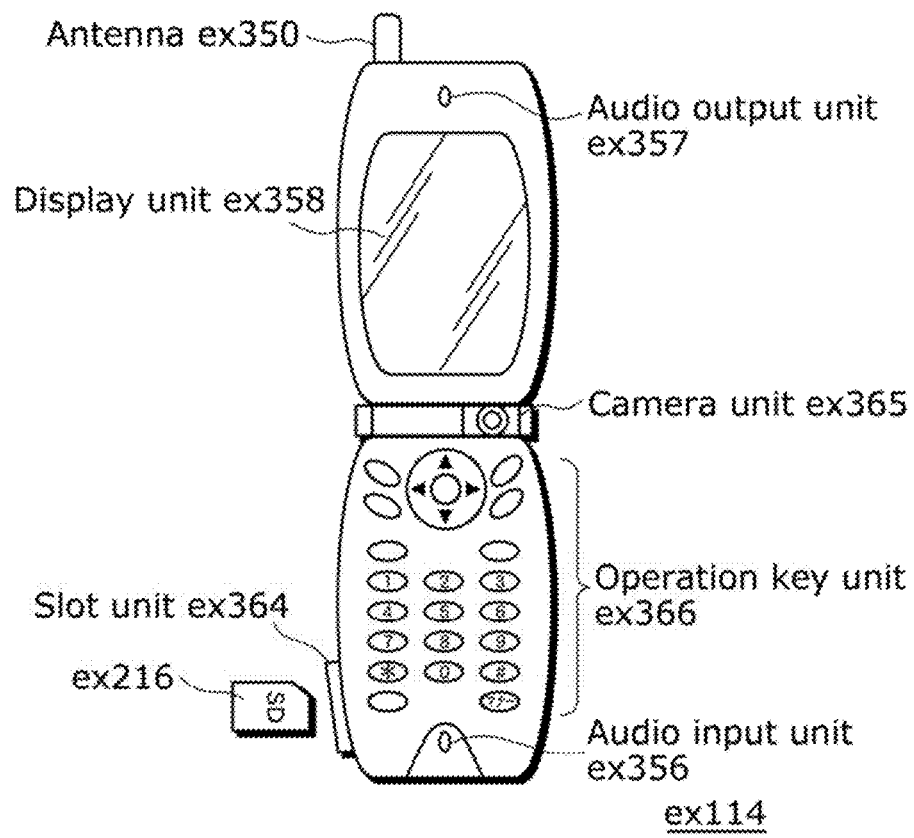
FIG. 26A shows an example of a cellular phone.

FIG. 26A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 26B:
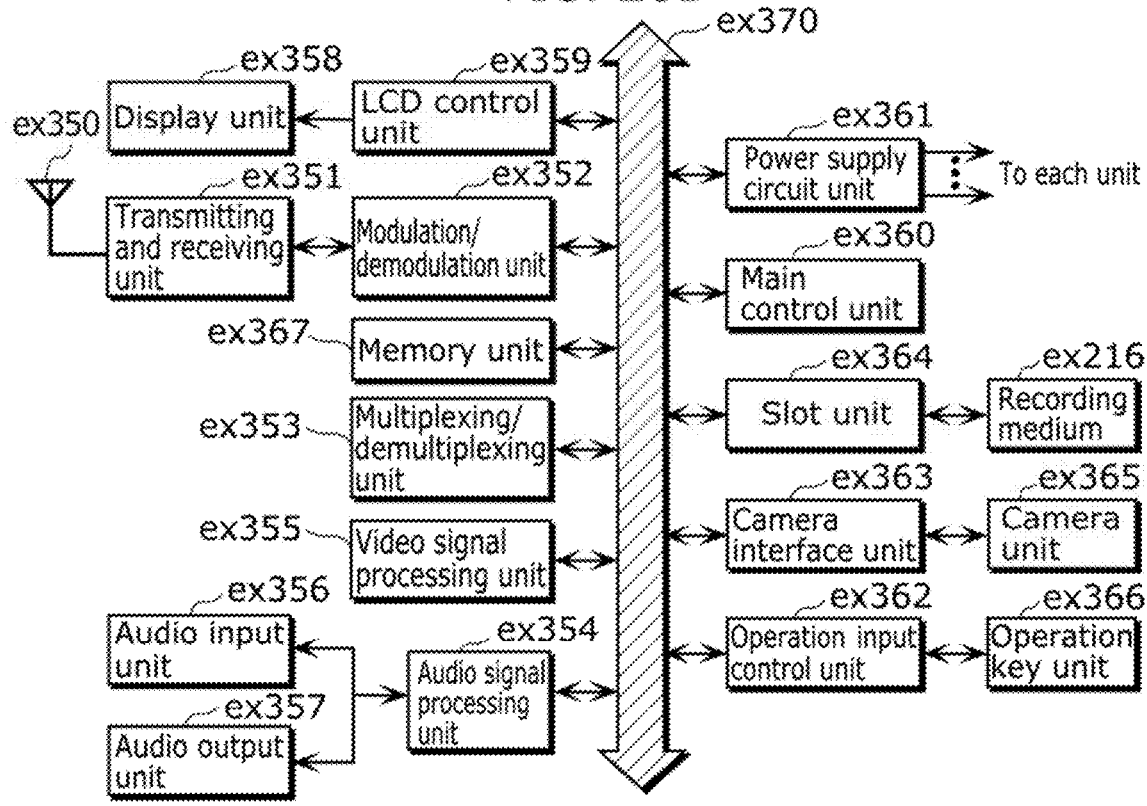
FIG. 26B is a block diagram showing an example of a configuration of a cellular phone.

Next, an example of a configuration of the cellular phone ex114 will be described with reference to FIG. 26B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 3

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 27 illustrates a structure of the multiplexed data. As illustrated in FIG. 27, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 28:
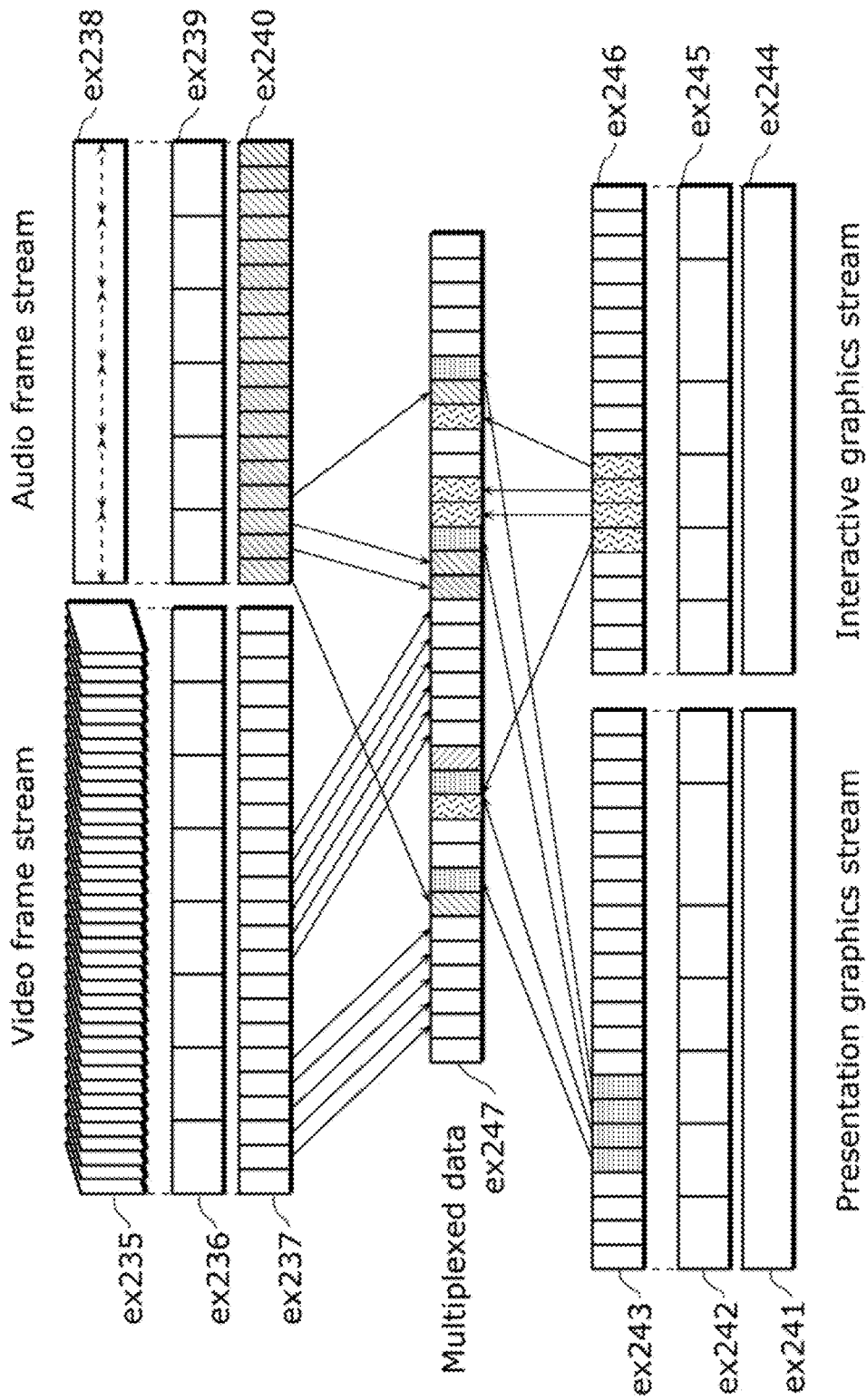
FIG. 28 schematically shows how each stream is multiplexed in multiplexed data.

FIG. 28 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 29:
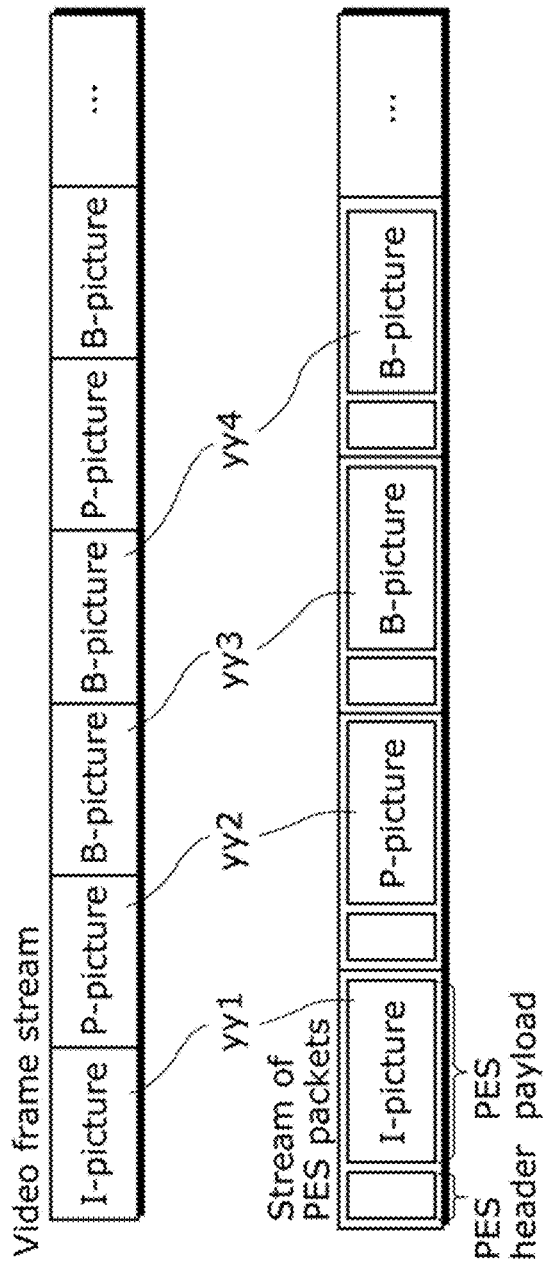
FIG. 29 shows how a video stream is stored in a stream of PES packets in more detail.

FIG. 29 illustrates how a video stream is stored in a stream of PES packets in more detail. The first bar in FIG. 29 shows a video frame stream in a video stream. The second bar shows the stream of PES packets. As indicated by arrows denoted as yy1, yy2, yy3, and yy4 in FIG. 29, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 30 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 30. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 31:
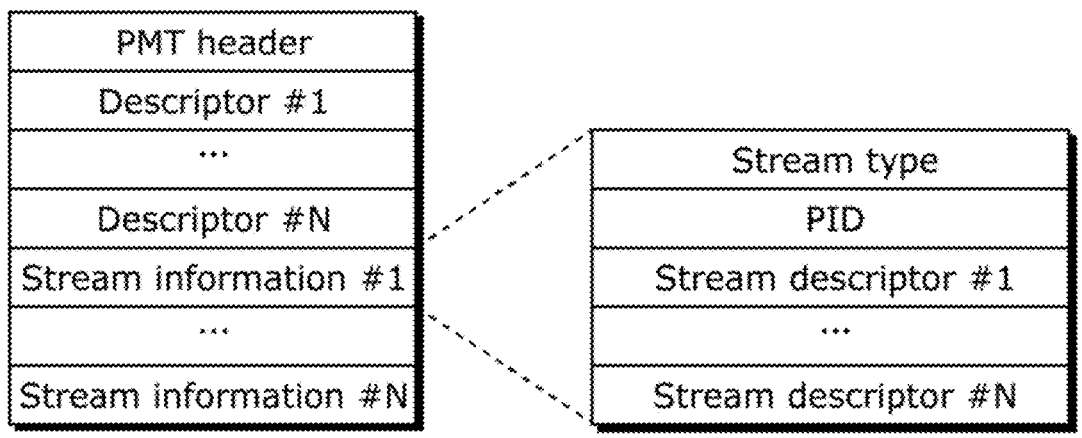
FIG. 31 shows a data structure of a PMT.

FIG. 31 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 32:
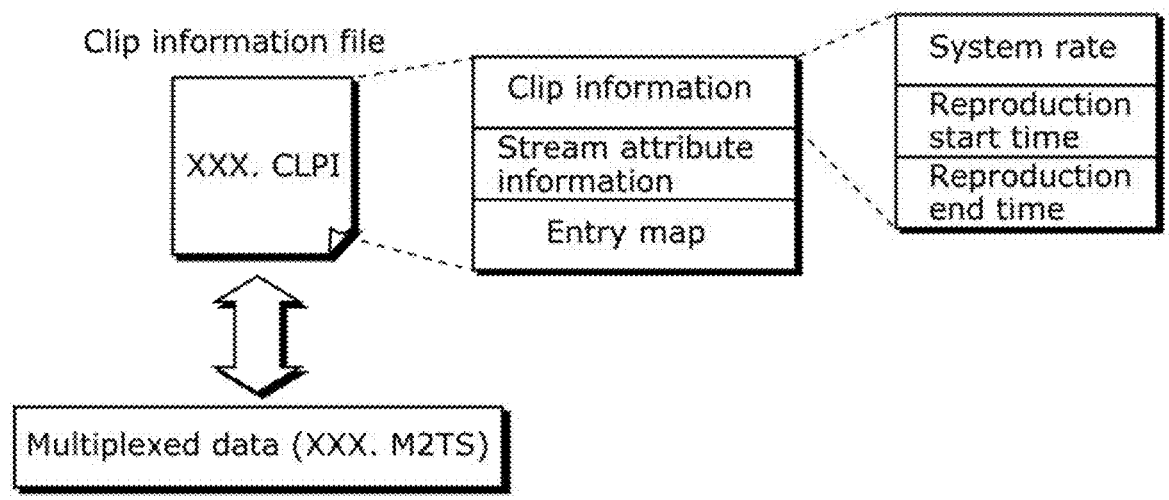
FIG. 32 shows an internal structure of multiplexed data information.

Each of the multiplexed data information files is management information of the multiplexed data as shown in FIG. 32. The multiplexed data information files are in one to one correspondence with the multiplexed data, and each of the files includes multiplexed data information, stream attribute information, and an entry map.

Figure 33:
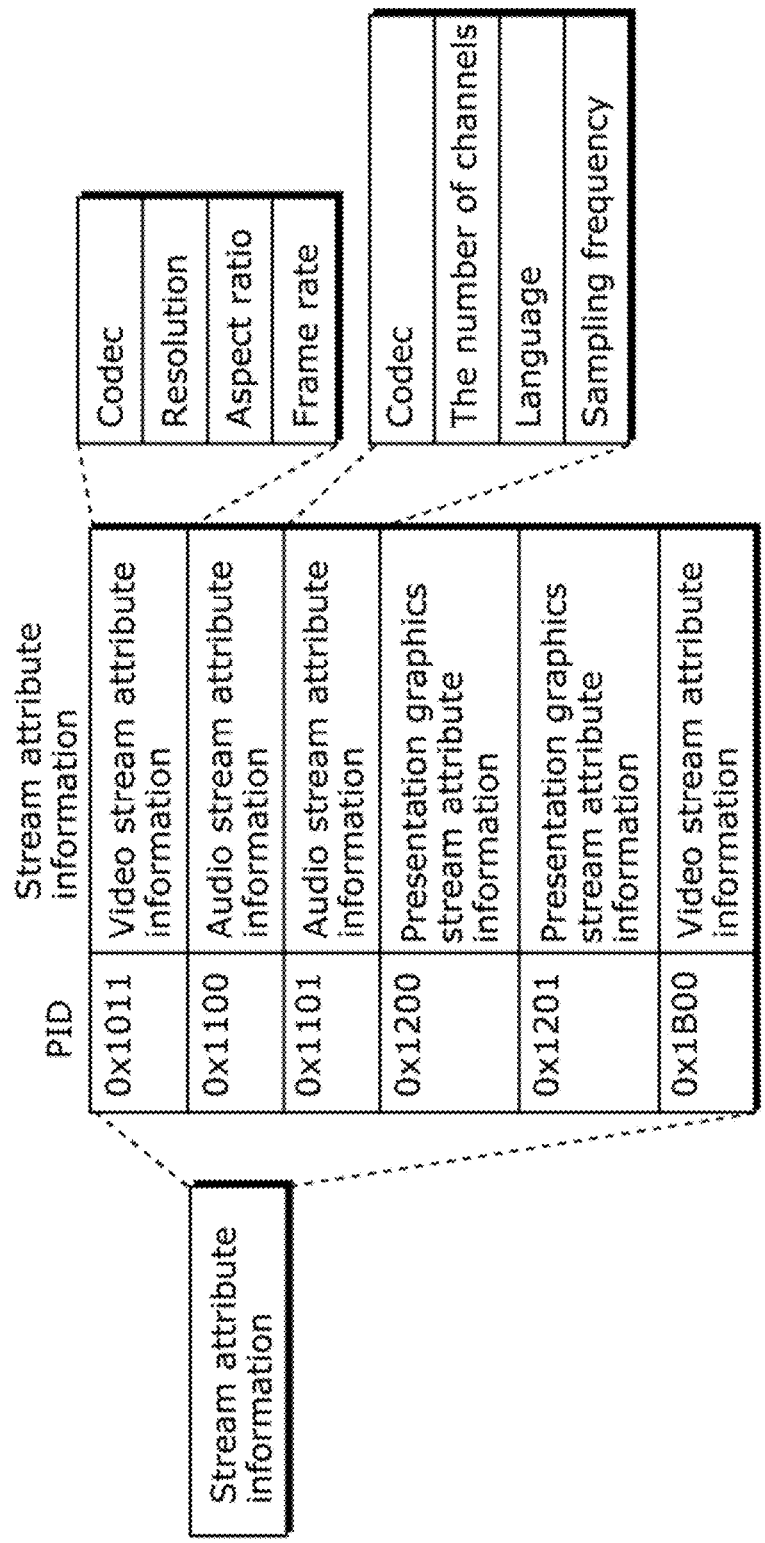
FIG. 33 shows an internal structure of stream attribute information.

As illustrated in FIG. 32, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set As shown in FIG. 33, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 34:
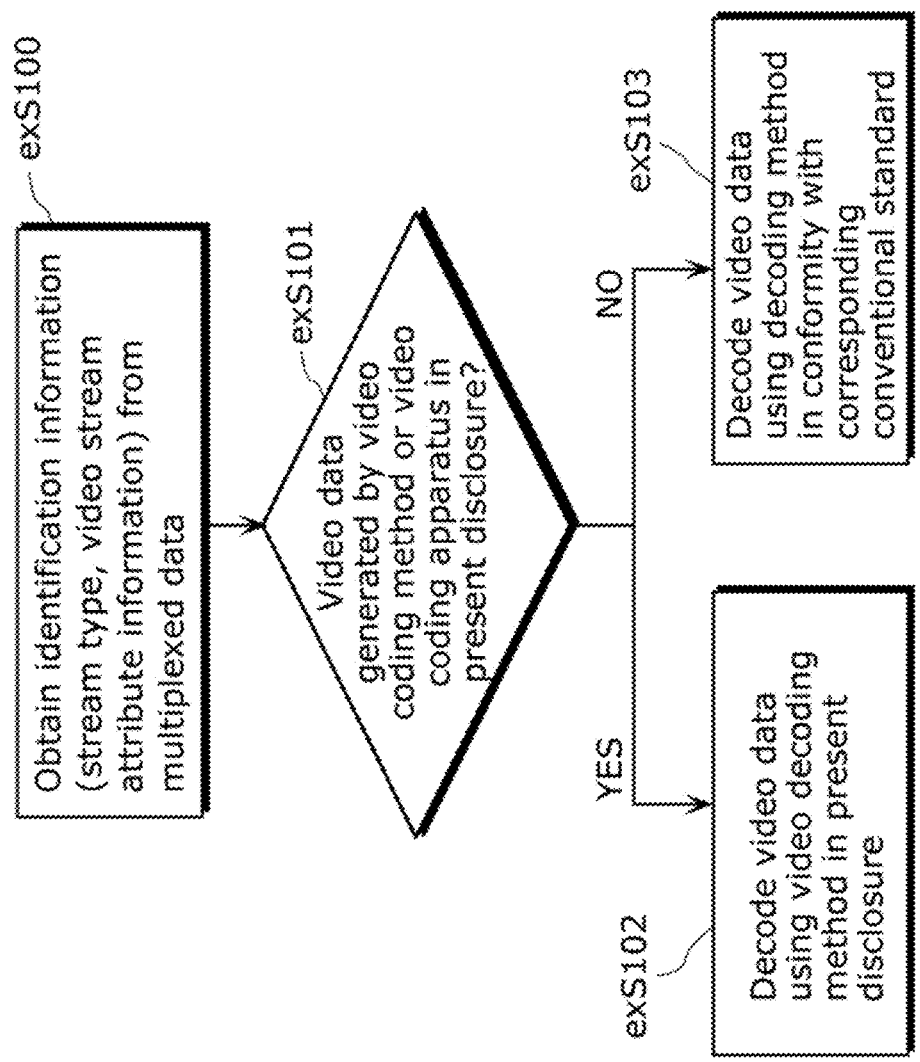
FIG. 34 shows steps for identifying video data.

Furthermore, FIG. 34 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 4

Figure 35:
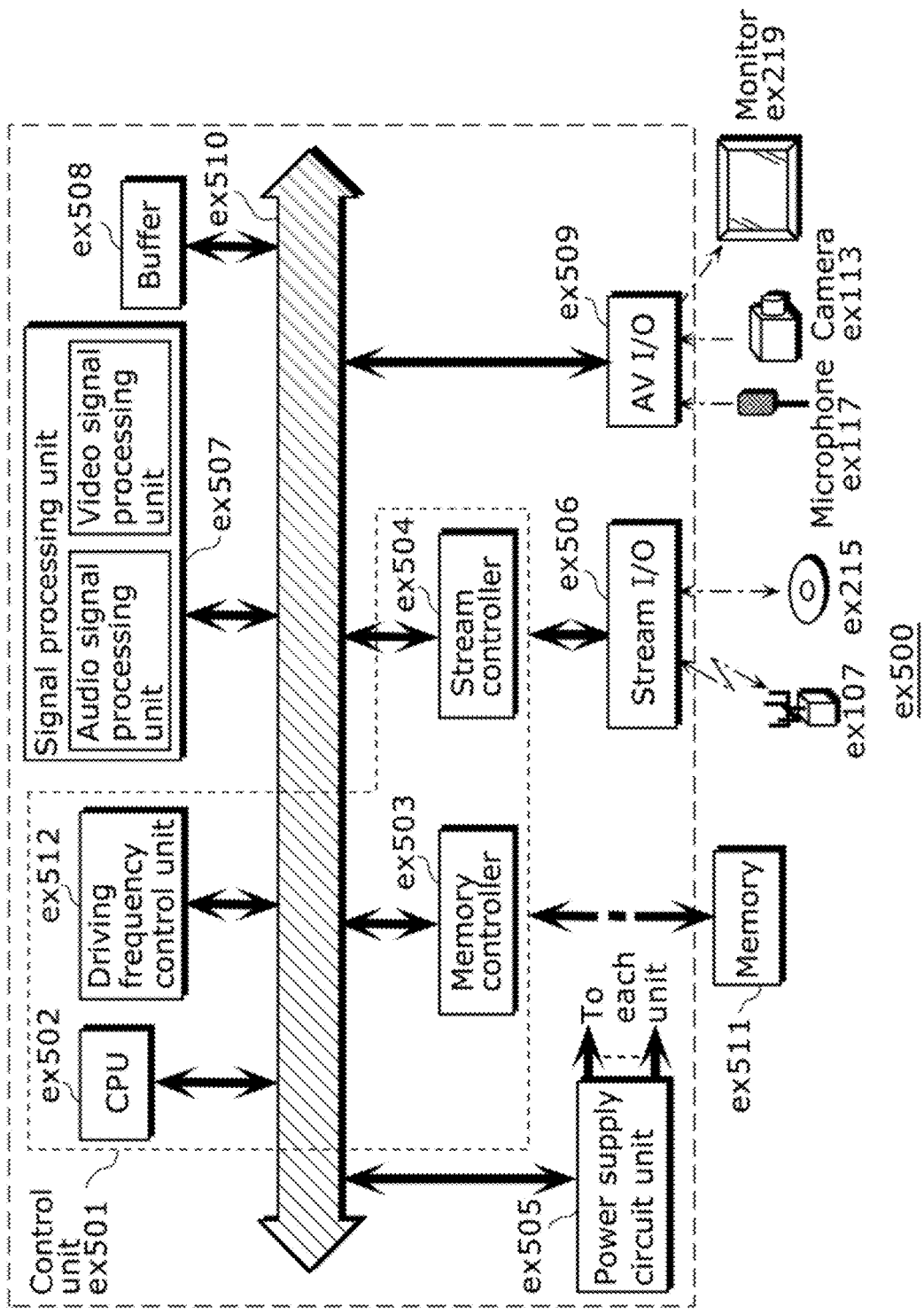
FIG. 35 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 35 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers.

Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 5

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 36:
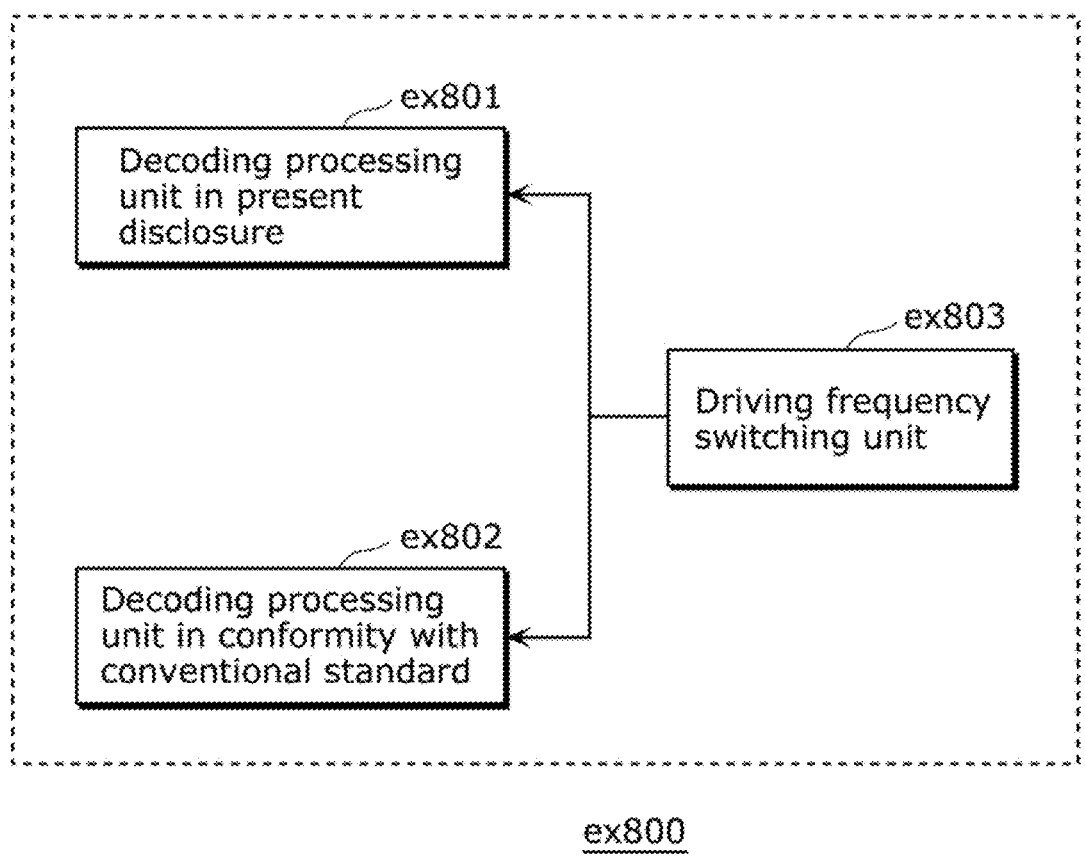
FIG. 36 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 36 illustrates a configuration ex800 in the present embodiment. A driving frequency switching unit ex803 sets a driving frequency to a higher driving frequency when video data is generated by the moving picture coding method or the moving picture coding apparatus described in each of embodiments.

Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 35. Here, each of the decoding processing unit ex801 that executes the moving picture decoding method described in each of embodiments and the decoding processing unit ex802 that conforms to the conventional standard corresponds to the signal processing unit ex507 in FIG. 35. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 38. The driving frequency can be selected by storing the look-up table in the buffer ex508 and in an internal memory of an LSI, and with reference to the look-up table by the CPU ex502.

Figure 37:
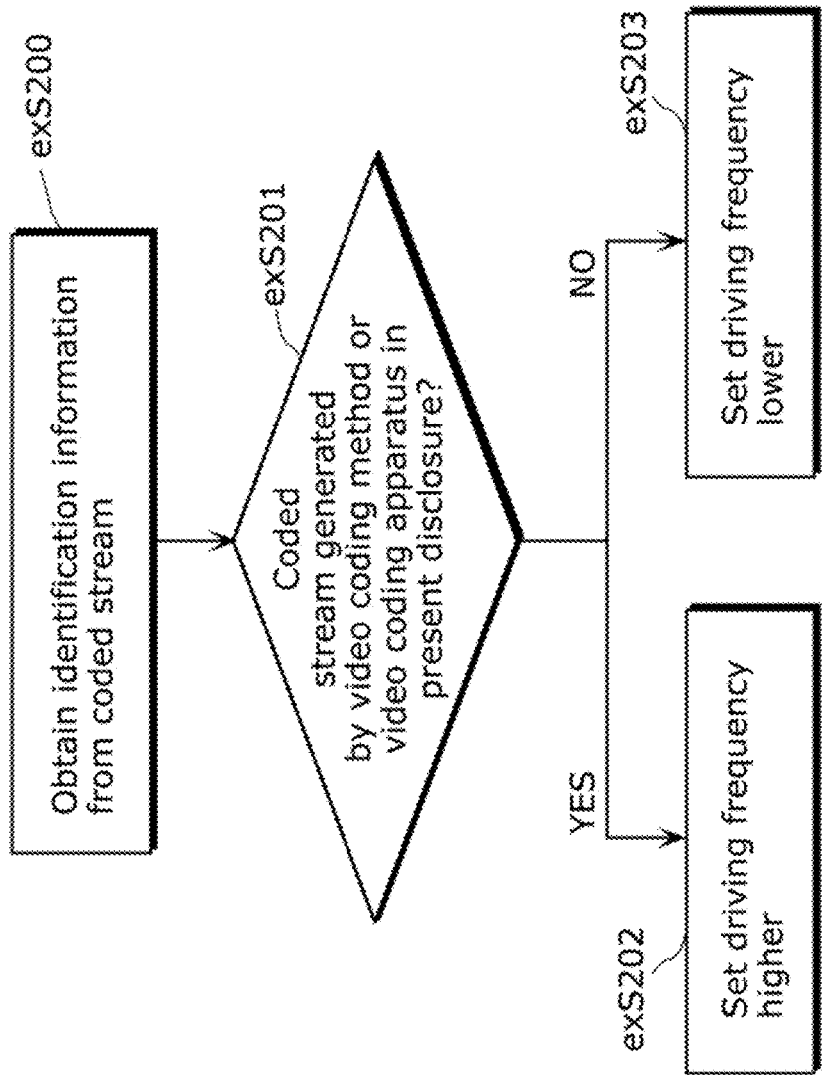
FIG. 37 shows steps for identifying video data and switching between driving frequencies.

FIG. 37 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 39A:
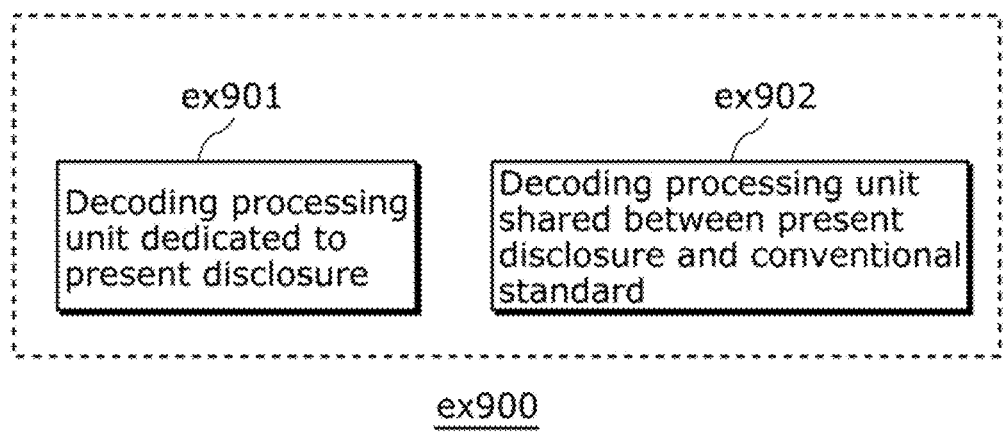
FIG. 39A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 39A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 39B:
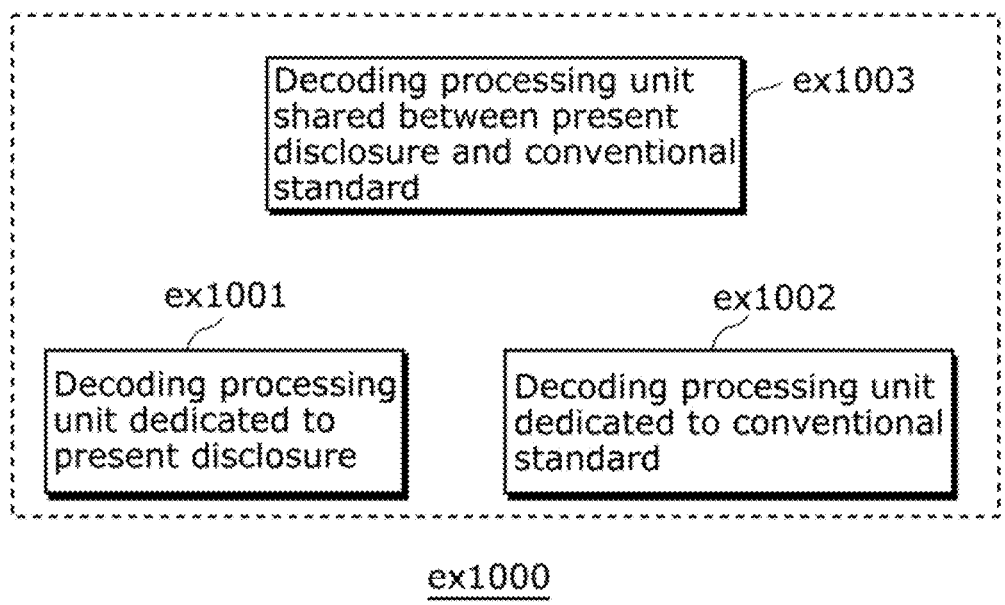
FIG. 39B is a diagram showing another example of a configuration for sharing a module of the signal processing unit.

Furthermore, ex1000 in FIG. 39B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500. As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The moving picture coding method and moving picture decoding method according to the present disclosure are applicable to any types of multimedia data where the methods are performed with reduced load and the same coding efficiency using motion vectors having limited magnitude. For example, the moving picture coding method and moving picture decoding method can be useful in data storage, transmission, communication, etc. using mobile phones, DVD apparatuses, and personal computers.

The invention claimed is:
1. A method for encoding a current block, the method comprising:
    deriving a motion vector predictor from a reference block, wherein the reference block is either (i) a neighboring block spatially adjacent to the current block and included in a current picture or (ii) a collocated block included in a picture other than the current picture;
    adding the derived motion vector predictor to a motion vector predictor list (MVP list); and
    encoding the current block by selecting one of the motion vector predictors from the MVP list,
    wherein when the reference block is a collocated block included in a picture other than the current picture, the deriving the motion vector predictor includes:
    calculating a second motion vector by scaling a first motion vector of the reference block based on a ratio of a temporal distance between the current picture including the current block and a current reference picture, and a temporal distance between a picture including the reference block and a reference picture referred to by the reference block;
    determining whether a magnitude of a horizontal component of the second motion vector or of a vertical component of the second motion vector is within a predetermined magnitude range;
    when the magnitudes of the horizontal component and of the vertical component of the second motion vector are within the predetermined magnitude range, deriving the motion vector predictor as equal to the second motion vector; and when the magnitude of the horizontal component or of the vertical component of the second motion vector is not within the predetermined magnitude range, deriving the motion vector predictor by clipping the respective horizontal component or the respective vertical component of the second motion vector to have a magnitude within the predetermined magnitude range, and wherein the predetermined magnitude range is between −32768 to +32767.

2. A decoding method for decoding pictures on a block-by-block basis, the decoding method comprising:

selectively adding, to a list, a motion vector of each of one or more reference blocks of a current block each of which is (i) a neighboring block spatially adjacent to the current block and included in a current picture or (ii) a collocated block included in a picture other than the current picture;

selecting a motion vector used for decoding the current block from the list; and decoding the current block using the selected motion vector, wherein the adding of the motion vector includes:

calculating a second motion vector by scaling a first motion vector of the reference block based on a ratio of temporal distance between the current picture including the current block and a current reference picture, and a temporal distance between a picture including the reference block and a reference picture referred to by the reference block;

determining whether a magnitude of the second motion vector is within a predetermined fixed magnitude range or not;

adding the second motion vector to the list as the motion vector of the collocated block when the magnitude of the second motion vector is within the fixed magnitude range; and adding a third motion vector to the list as the motion vector of the collocated block when the magnitude of the second motion vector is not within the fixed magnitude range, the third motion vector being generated by clipping the second motion vector to have a magnitude within the fixed magnitude range, the fixed magnitude range is determined based on a bit precision of a motion vector, and the bit precision is 16 bits.

* * * * *